(12) United States Patent
Abe

(10) Patent No.: US 6,867,917 B1
(45) Date of Patent: Mar. 15, 2005

(54) REAL-IMAGE FINDER OPTICAL SYSTEM

(75) Inventor: Tetsuya Abe, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 42 days.

(21) Appl. No.: 09/708,045

(22) Filed: Nov. 8, 2000

(30) Foreign Application Priority Data

| Nov. 9, 1999 | (JP) | 11-318223 |
| Dec. 27, 1999 | (JP) | 11-371584 |
| Jan. 27, 2000 | (JP) | 2000-018786 |

(51) Int. Cl.$^7$ .................. G02B 15/14; G02B 23/00
(52) U.S. Cl. .............. 359/432; 359/422; 359/431; 359/643
(58) Field of Search .................. 359/362–363, 359/421–432, 642–647, 831–837, 676–692, 355, 618, 708; 396/373–386, 296

(56) References Cited

U.S. PATENT DOCUMENTS

| 4,275,639 | A | * | 6/1981 | Garber | 89/41.19 |
| 5,061,054 | A | * | 10/1991 | Ohshita | 359/399 |
| 5,231,534 | A | * | 7/1993 | Kato | 359/432 |
| 5,235,460 | A | | 8/1993 | Abe | 159/431 |
| 5,434,636 | A | | 7/1995 | Hasushita et al. | 396/373 |
| 5,694,244 | A | * | 12/1997 | Abe et al. | 359/432 |
| 5,721,638 | A | * | 2/1998 | Kim | 359/432 |
| 5,784,204 | A | * | 7/1998 | Kang | 359/686 |
| 5,847,881 | A | | 12/1998 | Yano | 359/676 |
| 6,035,145 | A | * | 3/2000 | Kanai | 396/379 |
| 6,075,645 | A | | 6/2000 | Hasushita | 359/431 |
| 6,088,545 | A | | 7/2000 | Abe et al. | 396/373 |
| 6,091,545 | A | | 7/2000 | Hasushita et al. | 359/618 |
| 6,115,182 | A | | 9/2000 | Hasushita | 359/618 |
| 6,125,238 | A | | 9/2000 | Hasushita et al. | 396/296 |
| 6,272,294 | B1 | * | 8/2001 | Abe | 396/384 |

FOREIGN PATENT DOCUMENTS

| JP | 10-10440 | 1/1998 | 359/431 |
| JP | 2000-81651 | 3/2000 | 359/431 |

* cited by examiner

Primary Examiner—Thong Q Nguyen
(74) Attorney, Agent, or Firm—Greenblum & Bernstein, P.L.C.

(57) ABSTRACT

A real-image finder optical system includes a positive objective optical system, an erecting optical system, and a positive eyepiece optical system, thereby an object image, which is formed by the objective optical system, and is upside down and reversed from left to right, is reinverted by the erecting optical system to the proper orientation. The erecting optical system includes a plurality of reflection surfaces, at least one of which is provided along an optical path on the object side with respect to the position where the object image is formed, and at least another of which is provided along an optical path on the eyepiece side with respect to the position where the object image is formed. The eyepiece optical system includes a positive lens element having a transverse magnification of more than 1.0 provided between the object image (finder image) and the reflection surface provided on the eyepiece side with respect to the position where the object image is formed.

19 Claims, 29 Drawing Sheets

ER=7.6

-2.0  2.0
SPHERICAL
ABERRATION
CHROMATIC
ABERRATION

— d Line
······ g Line
--- C Line

B=11.3

-0.5  0.5
LATERAL
CHROMATIC
ABERRATION

B=11.3

-2.0  2.0
ASTIGMATISM

— S
-- M

B=11.3

-5.0(%)5.0
DISTORTION

ER=4.7

-2.0  2.0
SPHERICAL
ABERRATION
CHROMATIC
ABERRATION

— d Line
······ g Line
--- C Line

B=11.5

-0.5  0.5
LATERAL
CHROMATIC
ABERRATION

B=11.5

-2.0  2.0
ASTIGMATISM

— S
-- M

B=11.5

-5.0(%)5.0
DISTORTION

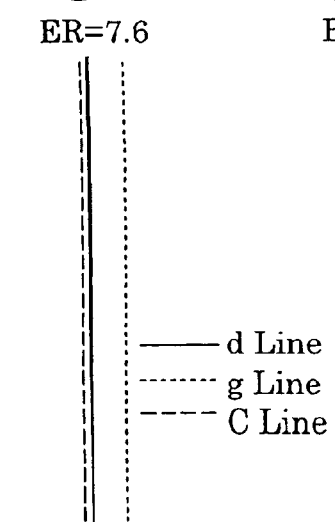
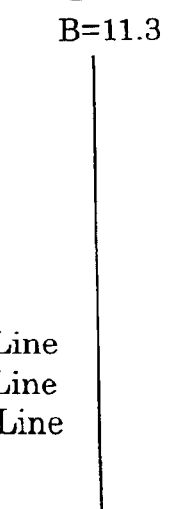
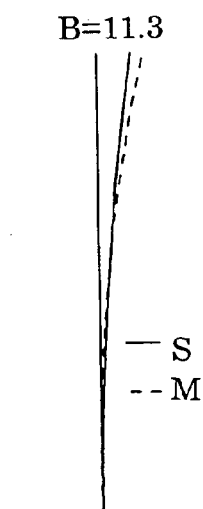
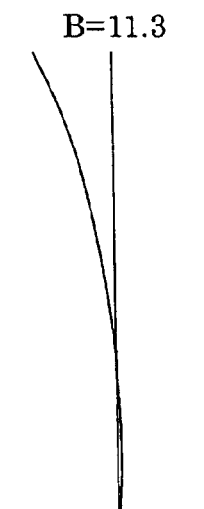
Fig.8A  ER=7.6  SPHERICAL ABERRATION  CHROMATIC ABERRATION
Fig.8B  B=11.3  LATERAL CHROMATIC ABERRATION
Fig.8C  B=11.3  ASTIGMATISM
Fig.8D  B=11.3  DISTORTION
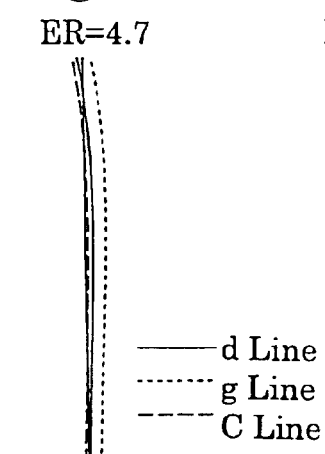
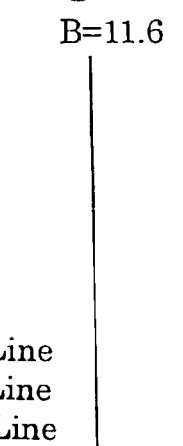
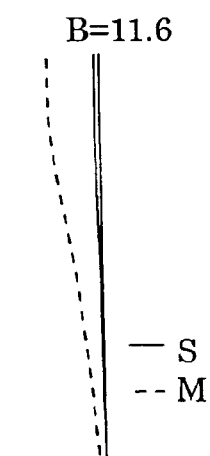
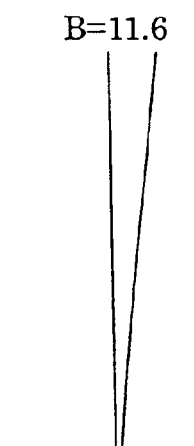
Fig.9A  ER=4.7  SPHERICAL ABERRATION  CHROMATIC ABERRATION
Fig.9B  B=11.6  LATERAL CHROMATIC ABERRATION
Fig.9C  B=11.6  ASTIGMATISM
Fig.9D  B=11.6  DISTORTION

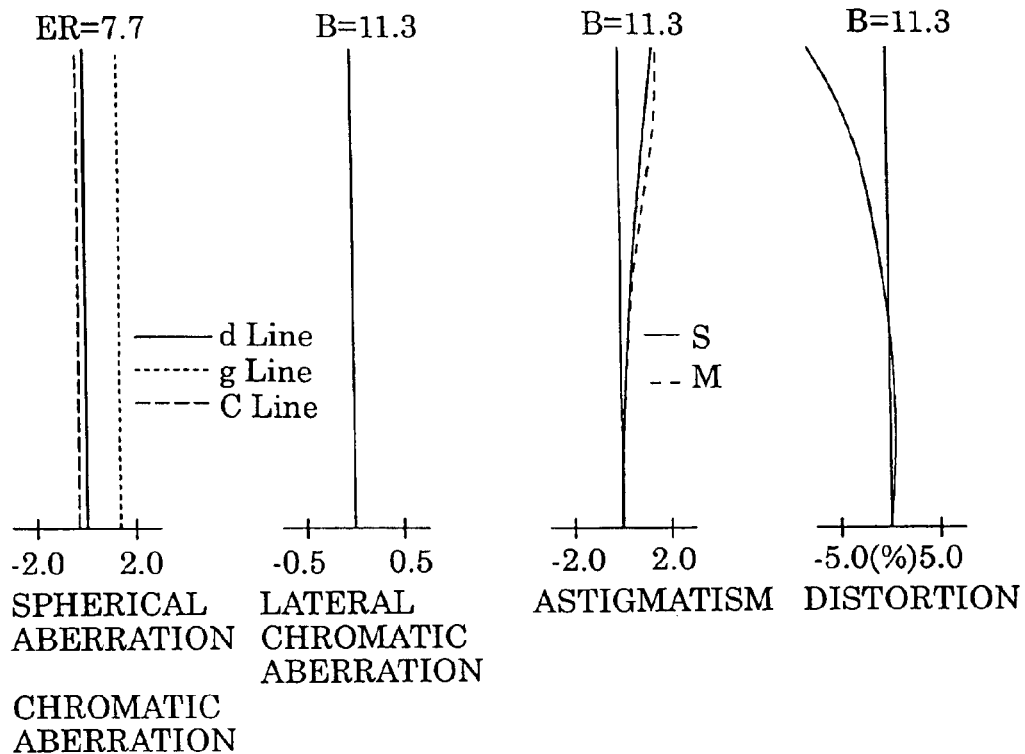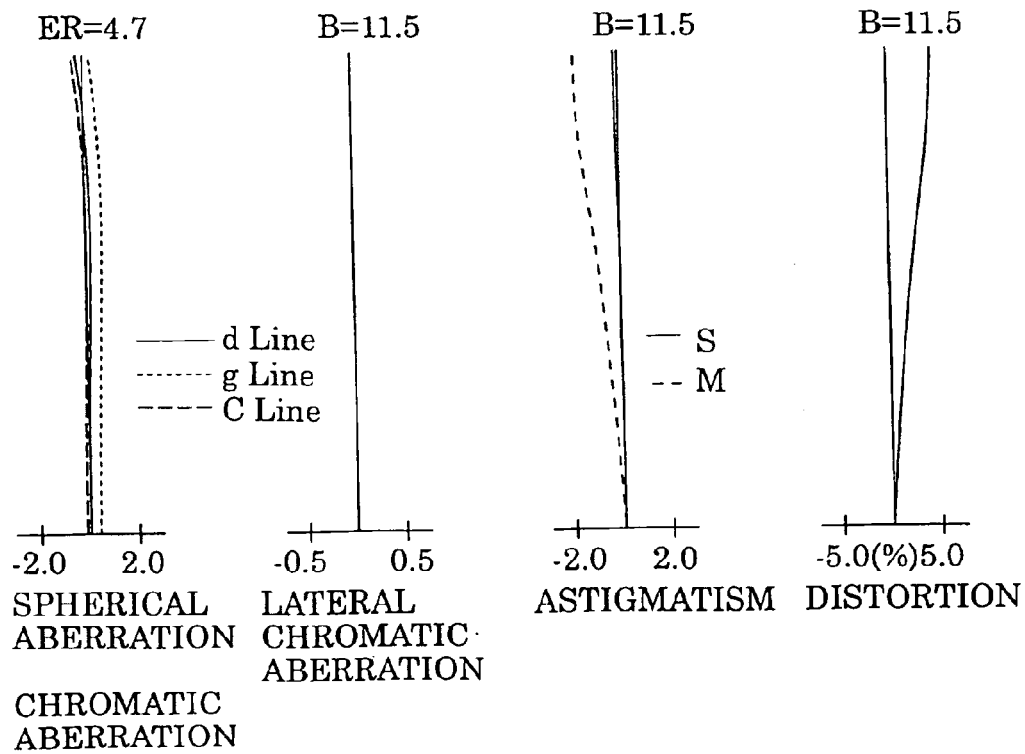

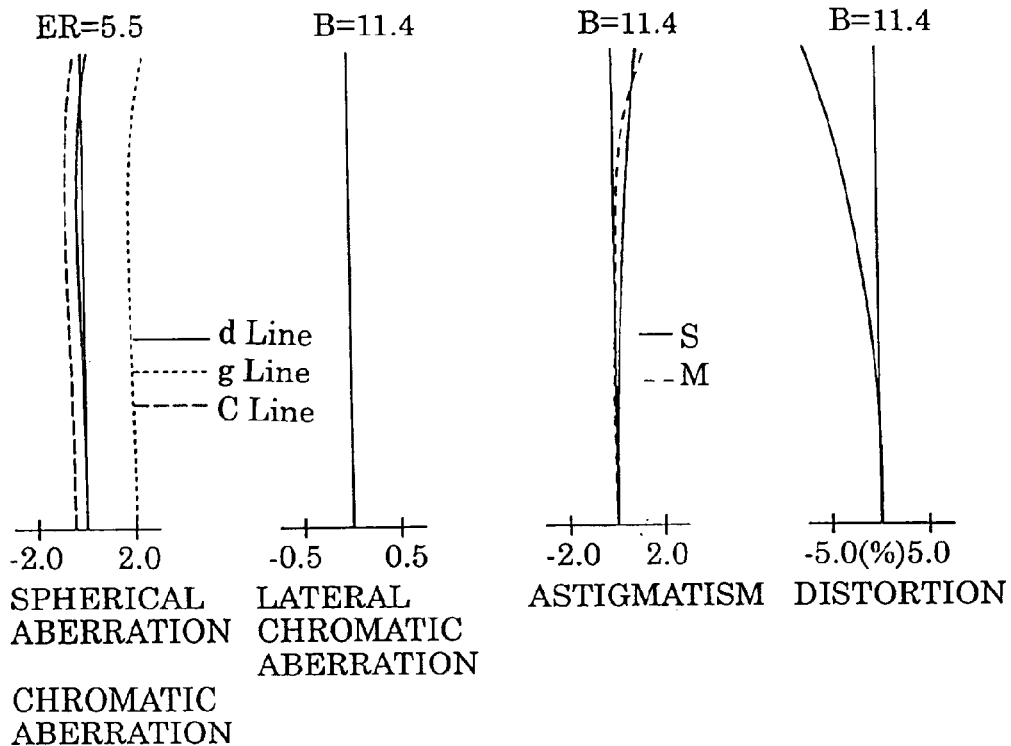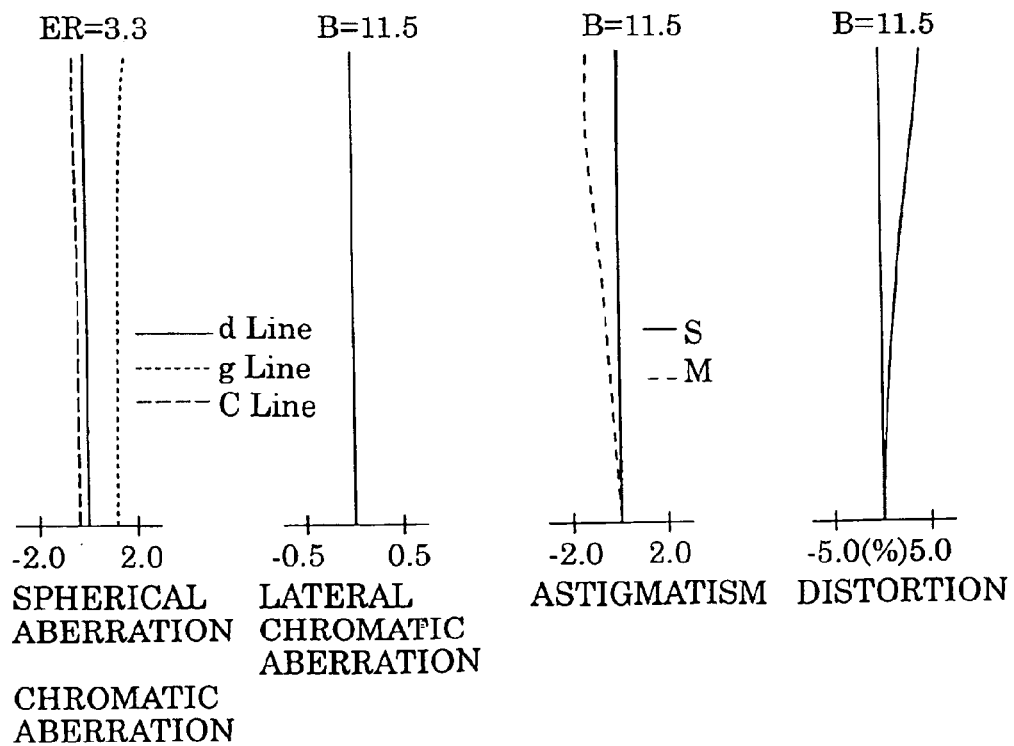

ER=7.6

-2.0    2.0
SPHERICAL
ABERRATION
CHROMATIC
ABERRATION

— d Line
······ g Line
---- C Line

B=11.3

-0.5    0.5
LATERAL
CHROMATIC
ABERRATION

B=11.3

-2.0    2.0
ASTIGMATISM

— S
-- M

B=11.3

-5.0(%)5.0
DISTORTION

ER=4.7

-2.0    2.0
SPHERICAL
ABERRATION
CHROMATIC
ABERRATION

— d Line
······ g Line
---- C Line

B=11.5

-0.5    0.5
LATERAL
CHROMATIC
ABERRATION

B=11.5

-2.0    2.0
ASTIGMATISM

— S
-- M

B=11.5

-5.0(%)5.0
DISTORTION

ER=7.5

SPHERICAL
ABERRATION
CHROMATIC
ABERRATION

B=11.3

LATERAL
CHROMATIC
ABERRATION

B=11.3

ASTIGMATISM

B=11.3

DISTORTION

ER=4.7

SPHERICAL
ABERRATION
CHROMATIC
ABERRATION

B=11.5

LATERAL
CHROMATIC
ABERRATION

B=11.5

ASTIGMATISM

B=11.5

DISTORTION

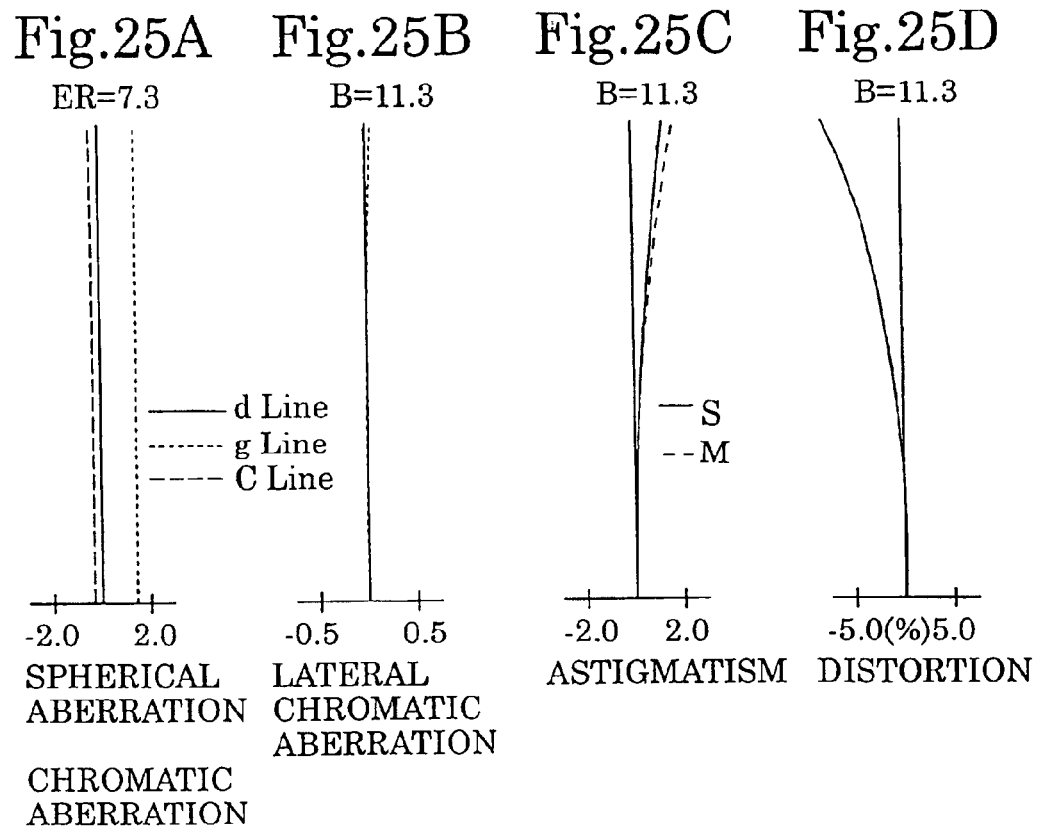
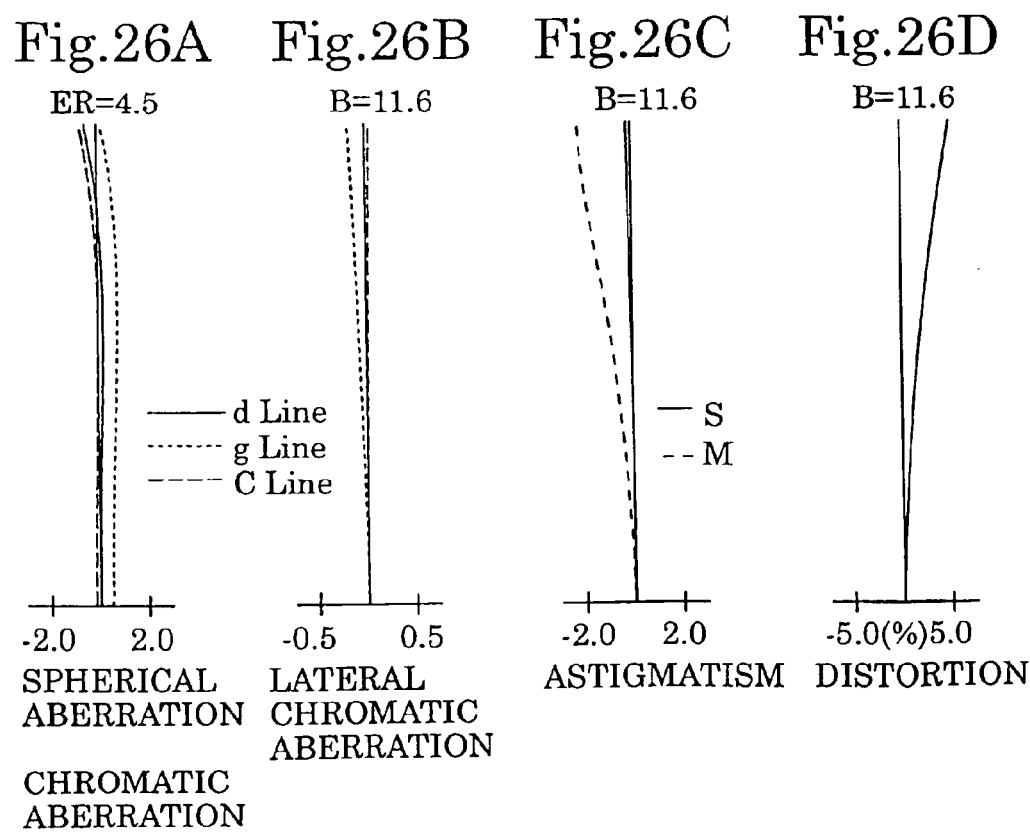

ER=6.8

— d Line
······ g Line
---- C Line

-2.0   2.0
SPHERICAL
ABERRATION
CHROMATIC
ABERRATION

B=11.4

-0.5   0.5
LATERAL
CHROMATIC
ABERRATION

B=11.4

— S
-- M

-2.0   2.0
ASTIGMATISM

B=11.4

-5.0(%)5.0
DISTORTION

ER=4.2

— d Line
······ g Line
---- C Line

-2.0   2.0
SPHERICAL
ABERRATION
CHROMATIC
ABERRATION

B=11.4

-0.5   0.5
LATERAL
CHROMATIC
ABERRATION

B=11.4

— S
-- M

-2.0   2.0
ASTIGMATISM

B=11.4

-5.0(%)5.0
DISTORTION

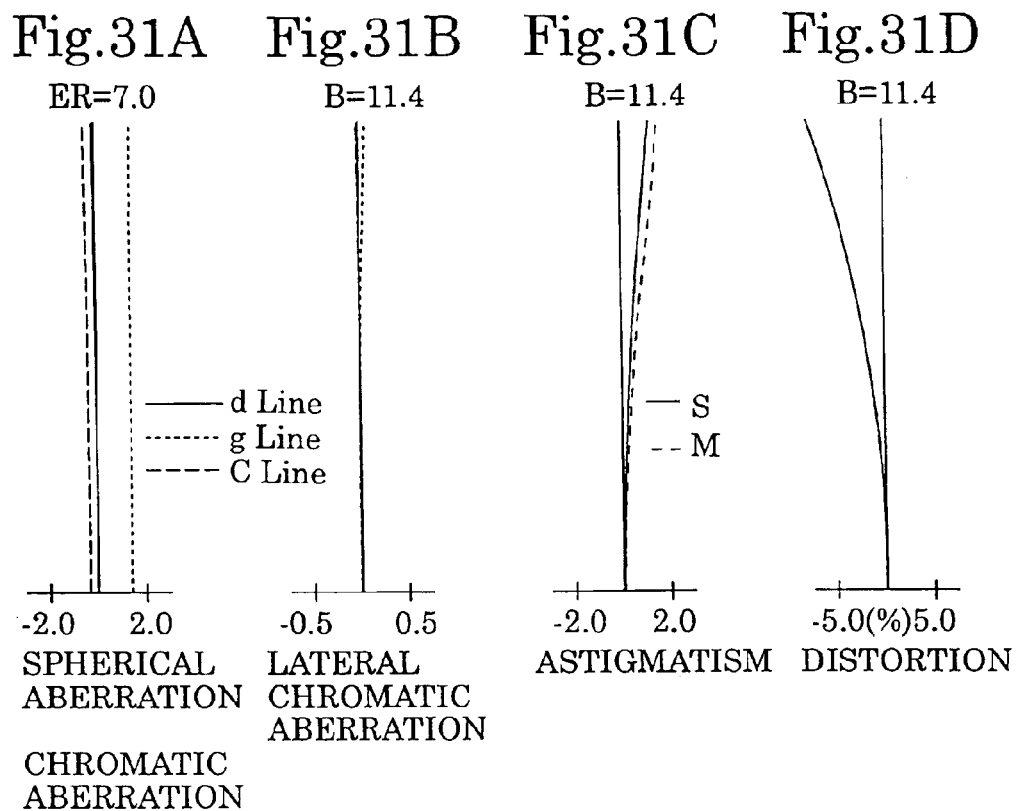
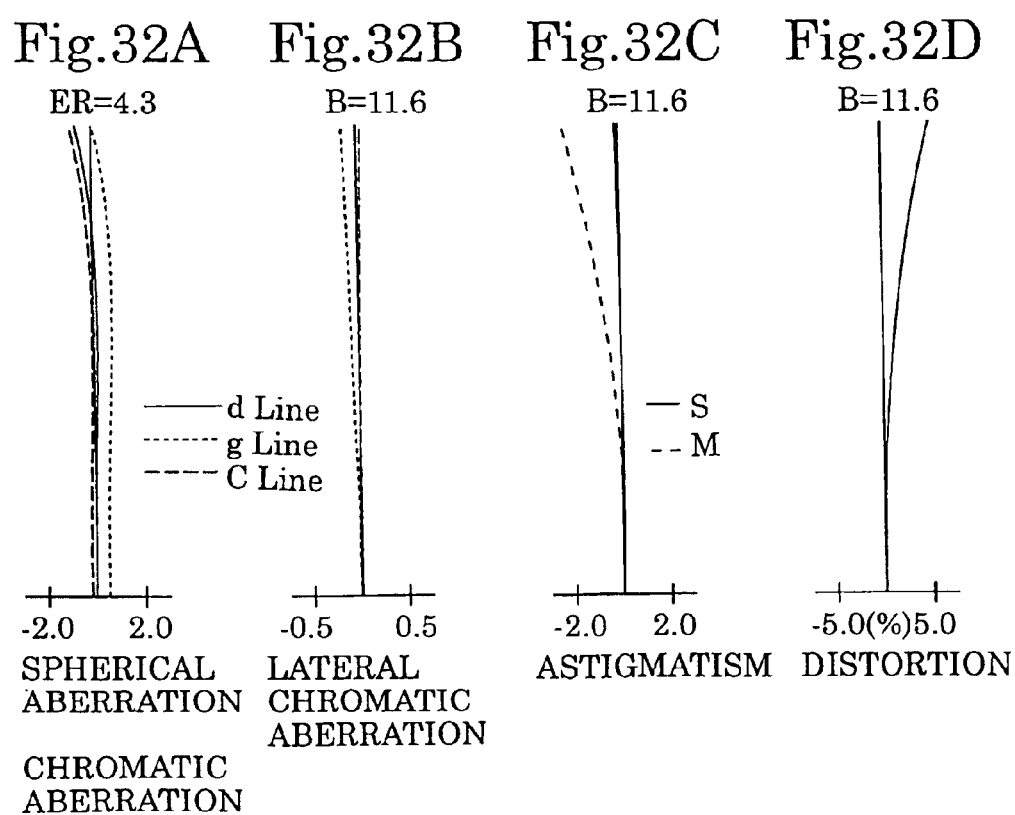

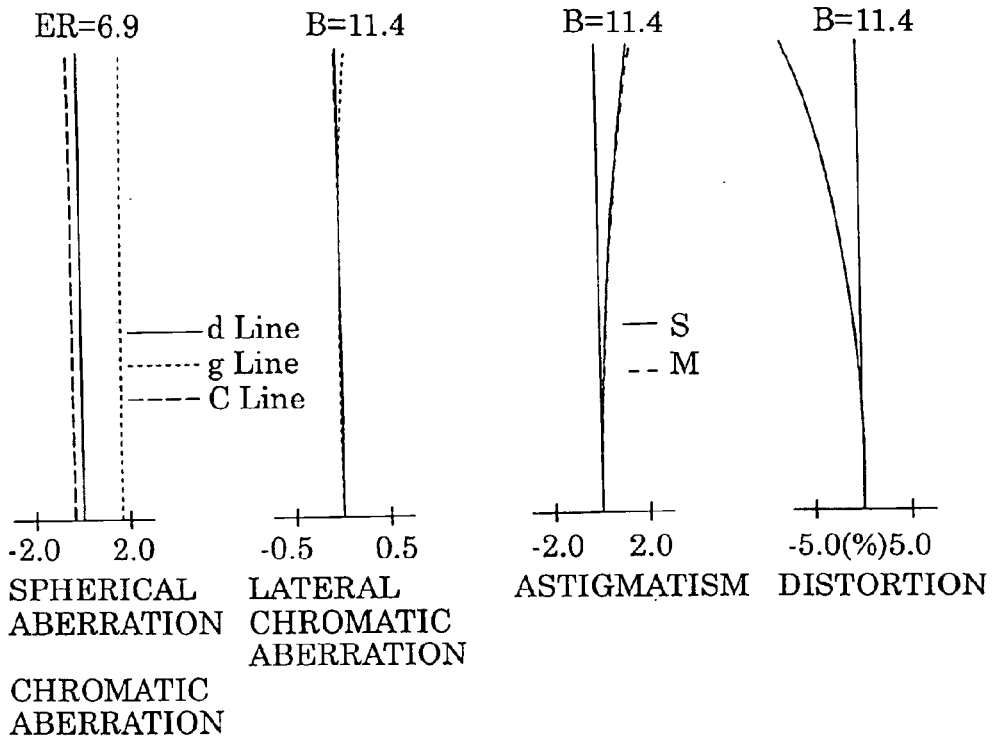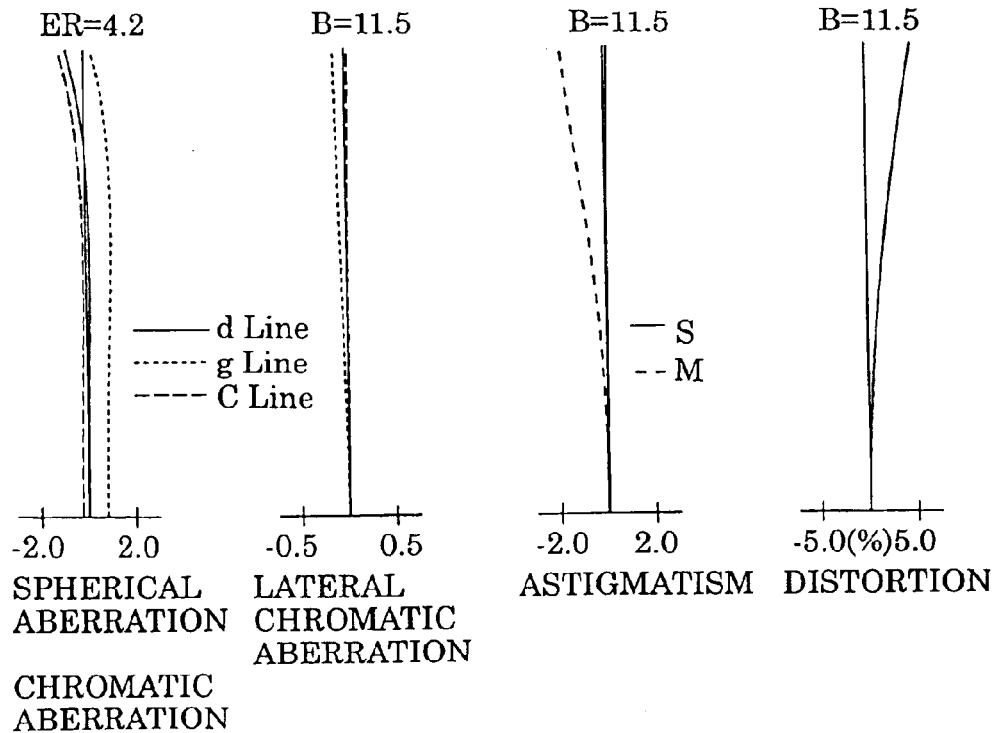

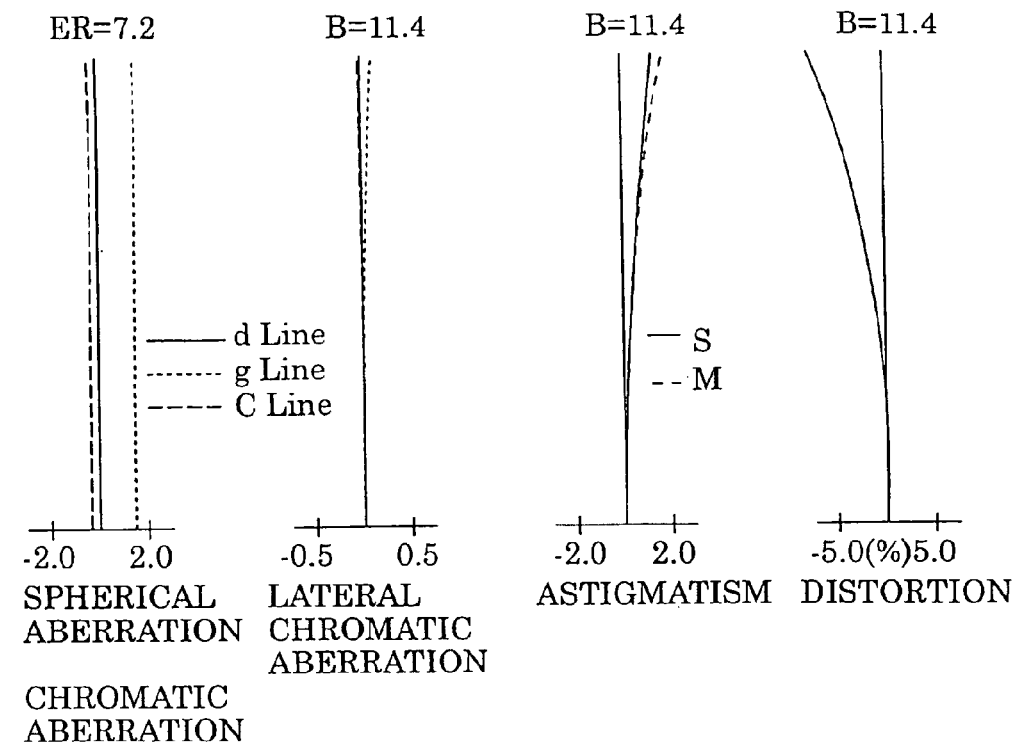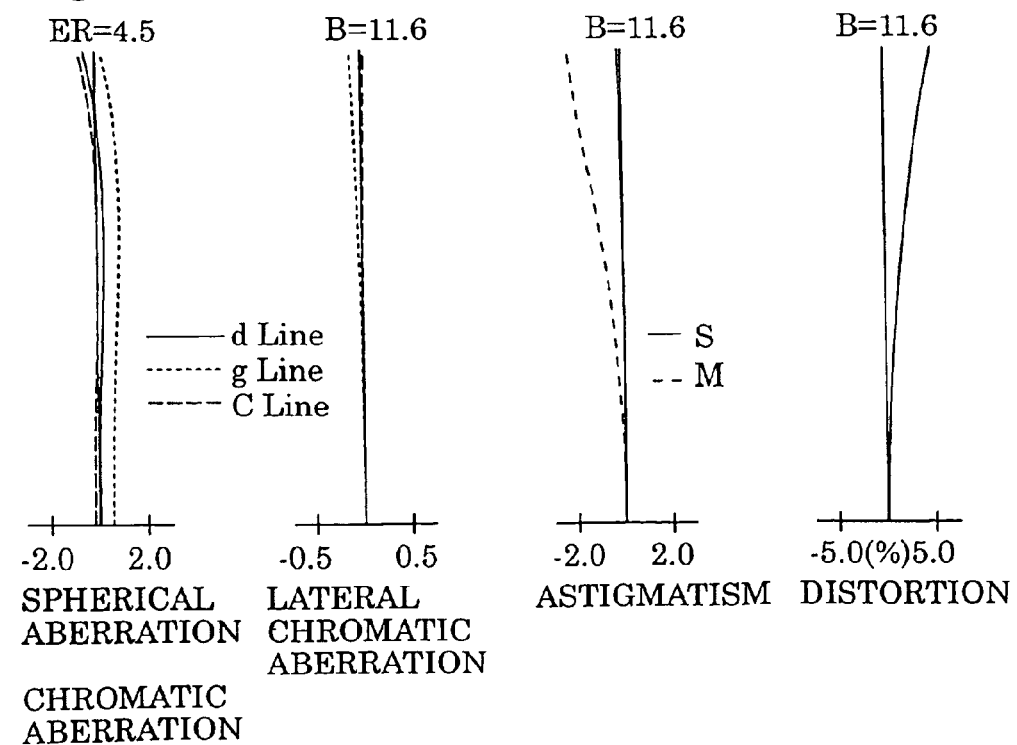

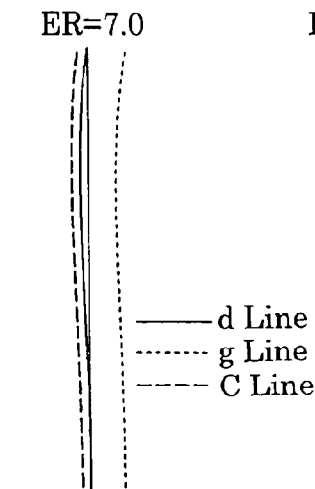
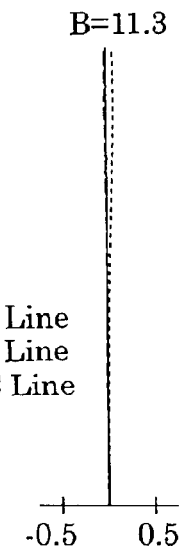
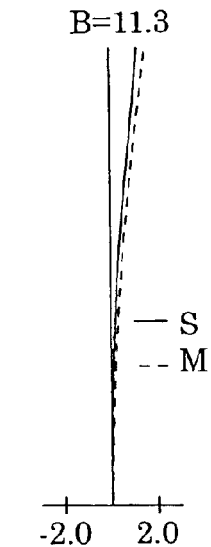
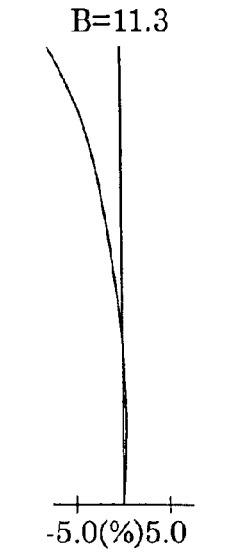
Fig.40A  Fig.40B  Fig.40C  Fig.40D
ER=7.0  B=11.3  B=11.3  B=11.3
— d Line
---- g Line
---- C Line
— S
-- M
-2.0  2.0    -0.5  0.5    -2.0  2.0    -5.0(%)5.0
SPHERICAL  LATERAL     ASTIGMATISM  DISTORTION
ABERRATION  CHROMATIC
            ABERRATION
CHROMATIC
ABERRATION
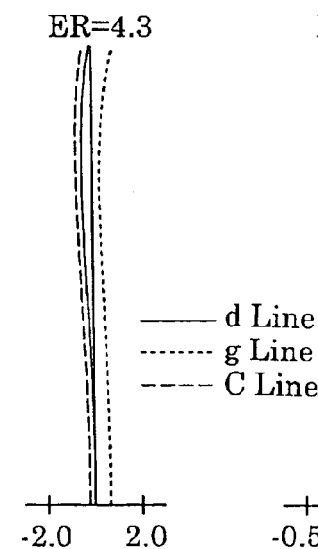
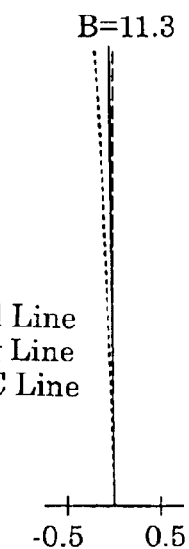
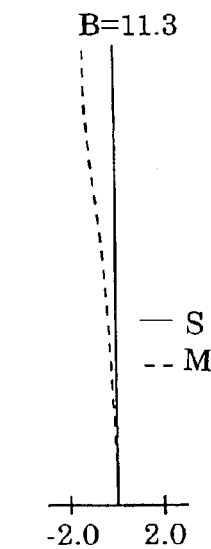
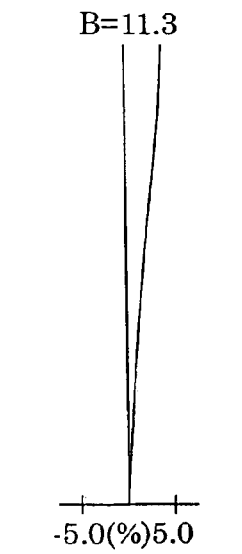
Fig.41A  Fig.41B  Fig.41C  Fig.41D
ER=4.3  B=11.3  B=11.3  B=11.3
— d Line
---- g Line
---- C Line
— S
-- M
-2.0  2.0    -0.5  0.5    -2.0  2.0    -5.0(%)5.0
SPHERICAL  LATERAL     ASTIGMATISM  DISTORTION
ABERRATION  CHROMATIC
            ABERRATION
CHROMATIC
ABERRATION

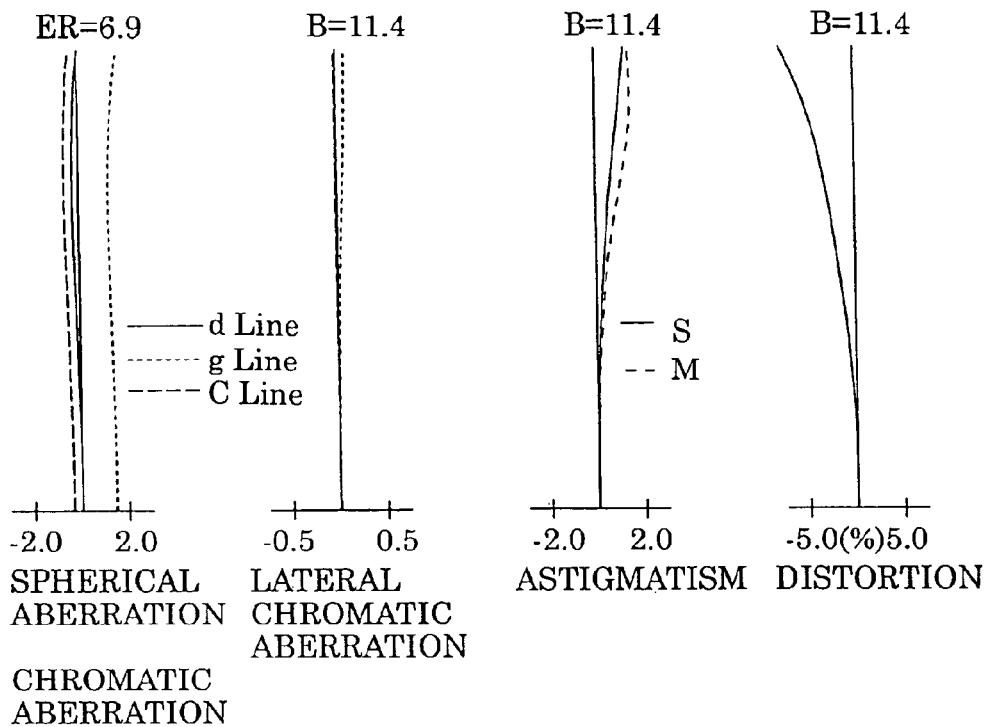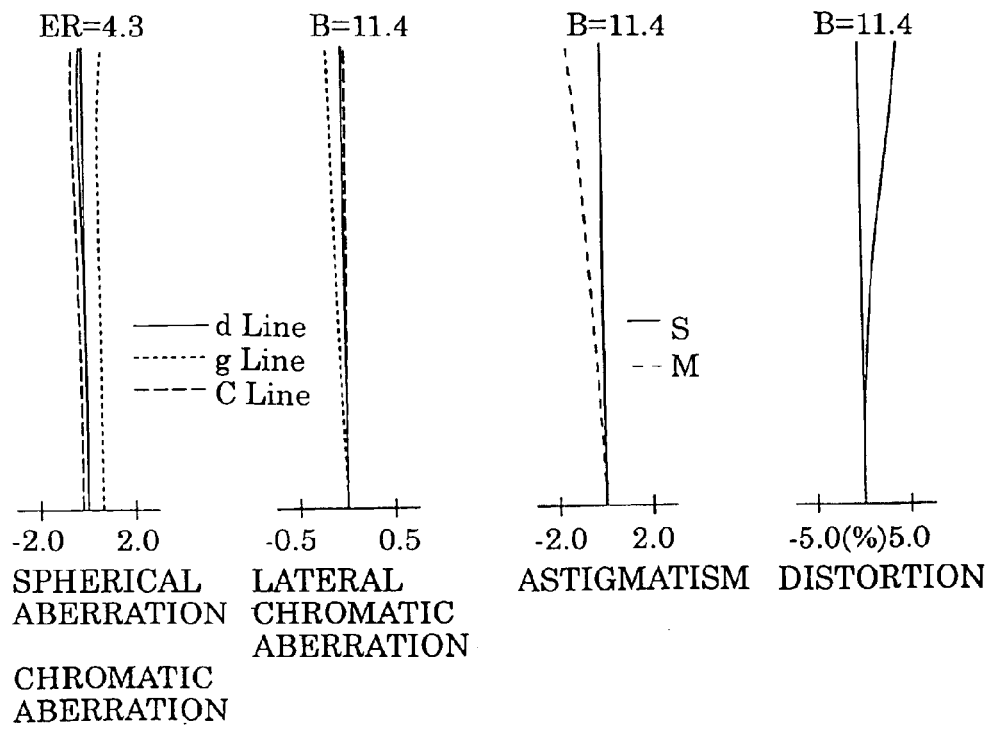

Fig.46A ER=6.6
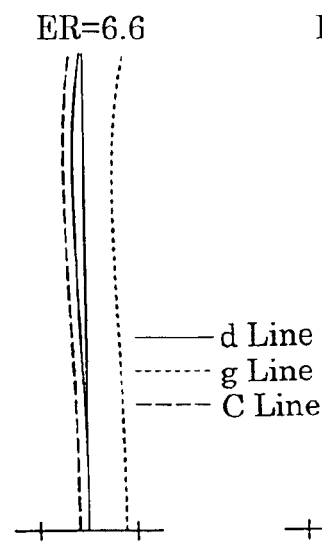
-2.0  2.0
SPHERICAL
ABERRATION
CHROMATIC
ABERRATION
Fig.46B B=11.4
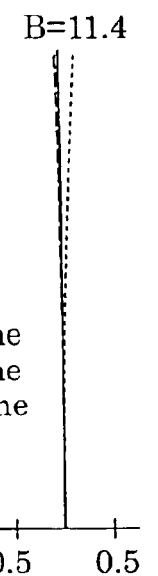
-0.5  0.5
LATERAL
CHROMATIC
ABERRATION
Fig.46C B=11.4
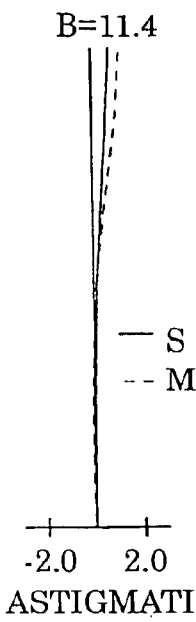
-2.0  2.0
ASTIGMATISM
Fig.46D B=11.4
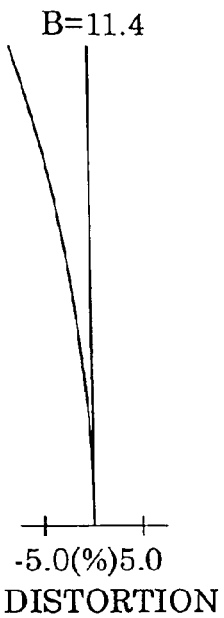
-5.0(%)5.0
DISTORTION
Fig.47A ER=4.1
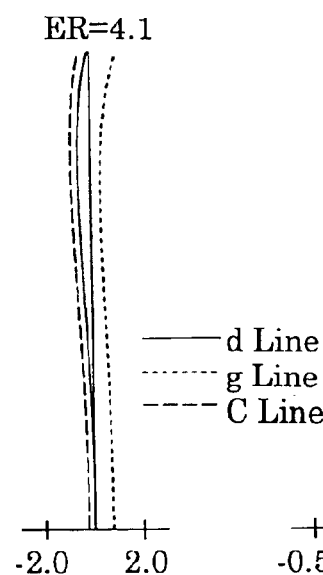
-2.0  2.0
SPHERICAL
ABERRATION
CHROMATIC
ABERRATION
Fig.47B B=11.5
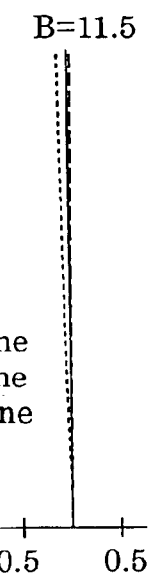
-0.5  0.5
LATERAL
CHROMATIC
ABERRATION
Fig.47C B=11.5
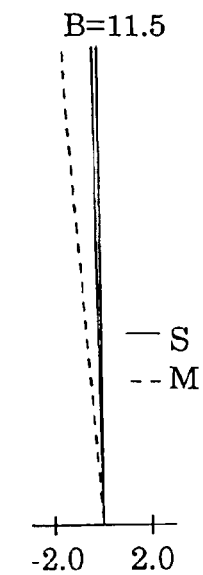
-2.0  2.0
ASTIGMATISM
Fig.47D B=11.5
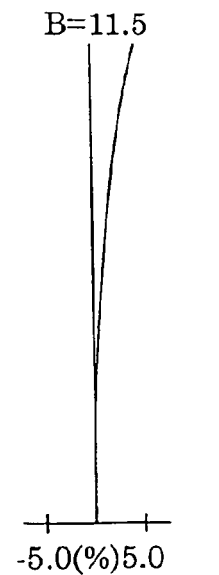
-5.0(%)5.0
DISTORTION

Fig.49A
ER=7.3

—— d Line
······ g Line
---- C Line

-2.0   2.0
SPHERICAL
ABERRATION
CHROMATIC
ABERRATION

Fig.49B
B=11.3

-0.5   0.5
LATERAL
CHROMATIC
ABERRATION

-2.0   2.0
ASTIGMATISM

Fig.49D
B=11.3

-5.0(%)5.0
DISTORTION

Fig.50A
ER=4.5

—— d Line
······ g Line
---- C Line

-2.0   2.0
SPHERICAL
ABERRATION
CHROMATIC
ABERRATION

Fig.50B
B=11.4

-0.5   0.5
LATERAL
CHROMATIC
ABERRATION

-2.0   2.0
ASTIGMATISM

Fig.50D
B=11.4

-5.0(%)5.0
DISTORTION

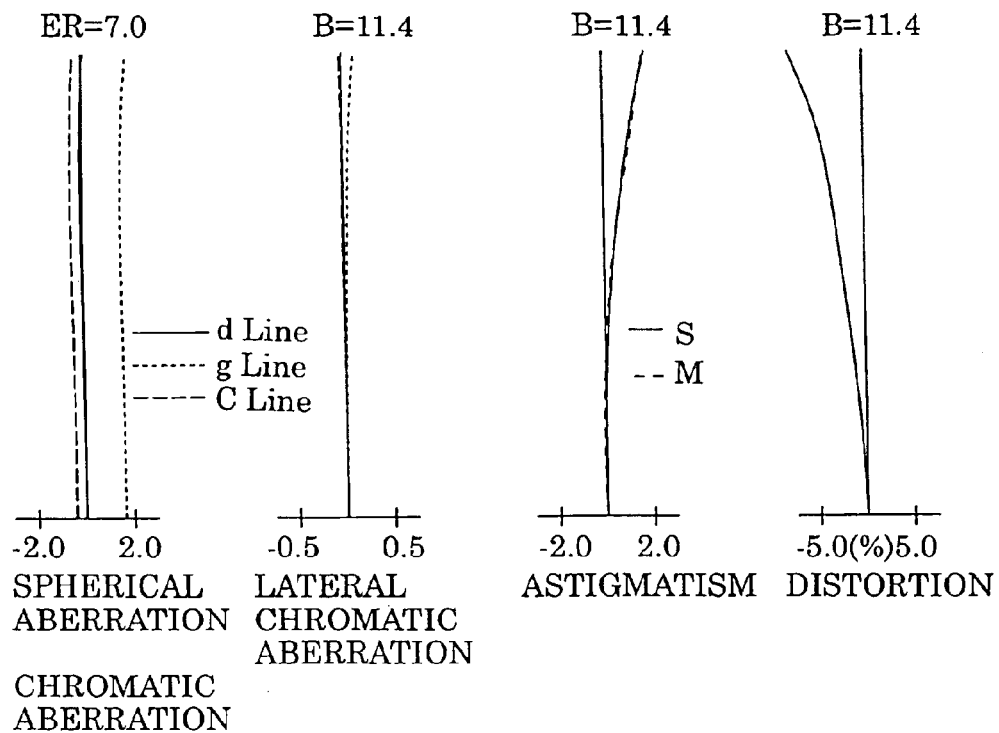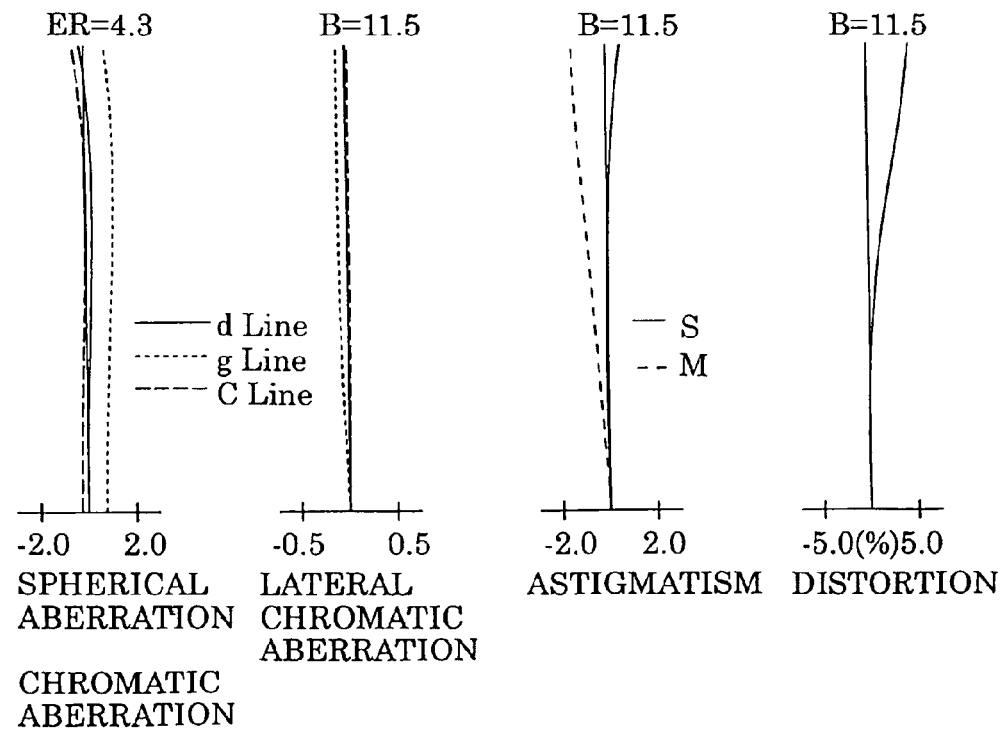

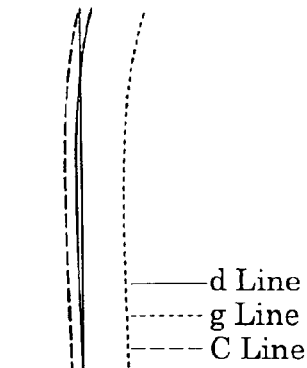 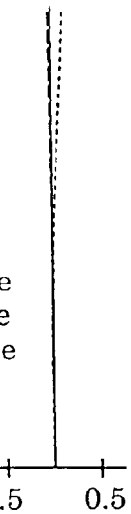 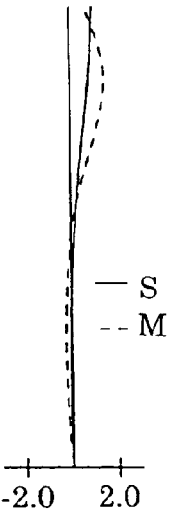 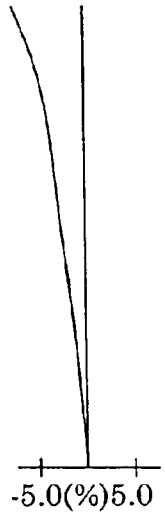
Fig.55A   Fig.55B   Fig.55C   Fig.55D
ER=6.3    B=11.5    B=11.5    B=11.5
SPHERICAL ABERRATION / CHROMATIC ABERRATION    LATERAL CHROMATIC ABERRATION    ASTIGMATISM    DISTORTION
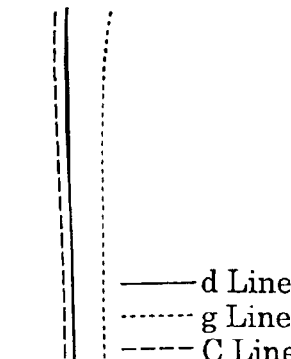 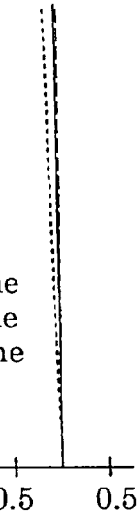 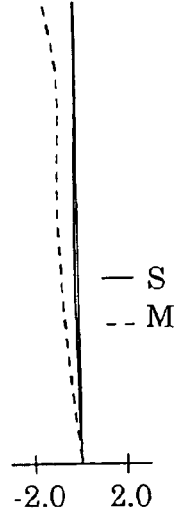 
Fig.56A   Fig.56B   Fig.56C   Fig.56D
ER=3.8    B=11.5    B=11.5    B=11.5
SPHERICAL ABERRATION / CHROMATIC ABERRATION    LATERAL CHROMATIC ABERRATION    ASTIGMATISM    DISTORTION

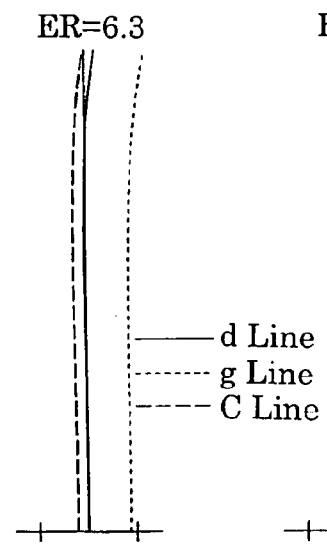
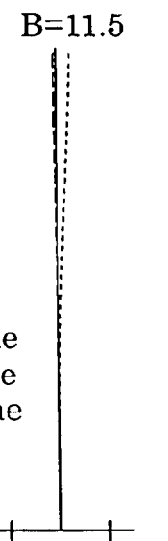
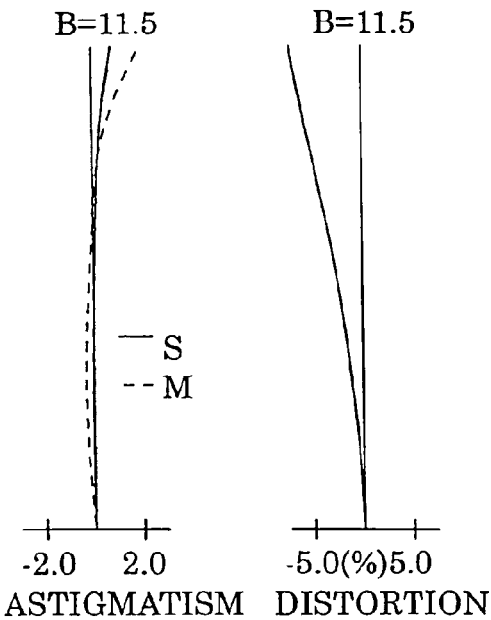
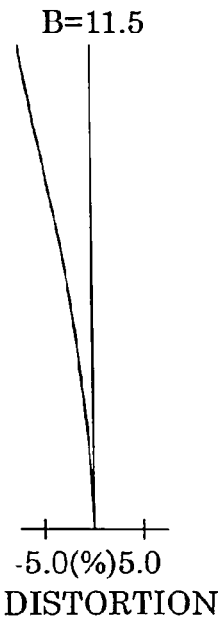
Fig.58A  Fig.58B  Fig.58C  Fig.58D
ER=6.3  B=11.5  B=11.5  B=11.5
-2.0  2.0   -0.5  0.5   -2.0  2.0   -5.0(%)5.0
SPHERICAL   LATERAL      ASTIGMATISM  DISTORTION
ABERRATION  CHROMATIC
            ABERRATION
CHROMATIC
ABERRATION
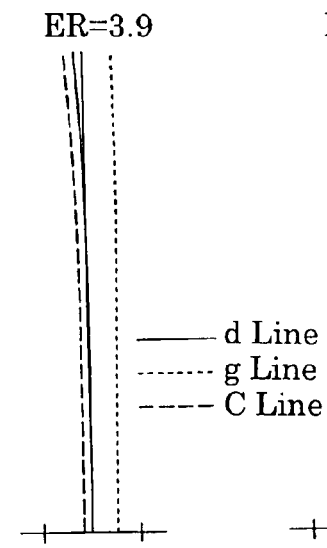
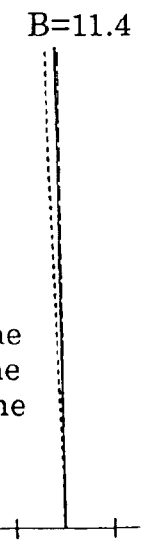
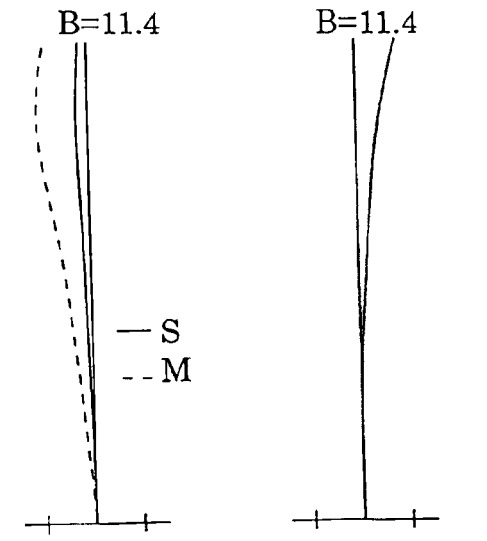
Fig.59A  Fig.59B  Fig.59C  Fig.59D
ER=3.9  B=11.4  B=11.4  B=11.4
-2.0  2.0   -0.5  0.5   -2.0  2.0   -5.0(%)5.0
SPHERICAL   LATERAL      ASTIGMATISM  DISTORTION
ABERRATION  CHROMATIC
            ABERRATION
CHROMATIC
ABERRATION

REAL-IMAGE FINDER OPTICAL SYSTEM

BACKGROUND OF THE INVENTION

1. Field of the Invention

The present invention relates to a real-image finder optical system applied to a camera in which the finder optical system is provided independently from the photographing optical system.

2. Description of the Related Art

A real-image finder optical system is constituted by a positive objective optical system for forming an inverted object image which is upside down and reversed from left to right, an erecting optical system for erecting the inverted object image formed by the objective optical system to the proper orientation, and an eyepiece lens element (eyepiece optical system) for viewing the erected object image reinverted by the erecting optical system. In such a real-image finder optical system, a focal point of the objective optical system is arranged to coincide with a focal point of the eyepiece lens element (eyepiece optical system), on the same optical axis. The overall length of the optical system therefor becomes longer. Accordingly, the thickness (length from front to back) of a camera, which is necessary to incorporate such an optical system, is undesirably increased. In a conventional real-image finder optical system, an arrangement has been made to shorten the distance between an object image and the erecting optical system by deflecting the optical axis through a plurality of reflection surfaces provided between the object image and the eyepiece optical system, thereby the front-to-back length of the finder optical system has been made shorter.

As an example for miniaturizing the real-image finer optical system in the front-to-back direction, a U.S. Pat. No. 5,235,460 has taught that reflection surfaces are provided along an object-side finder optical path with respect to the position where an object image is formed (hereinafter, an object image). An optical axis which is reflected by a reflection surface is deflected at a right-angle with respect to an optical axis which is incident thereon. According to this arrangement, the overall length of the finder optical system in the front-to-back direction can be reduced, thereby it is possible to reduce the thickness (length from front to back) of a camera, which is necessary to incorporate such an optical system. Furthermore, according to this arrangement, out of the reflection surfaces required to constitute the erecting optical system, the number of reflection surfaces between the object image and the eyepiece lens element (eyepiece optical system) can be reduced, thereby the optical path between the object image and the eyepiece lens element can be shortened. Consequently, the focal length of the eyepiece lens element can be comparatively shortened, and a real-image finder optical system having a high finder magnification can be obtained.

However, if a further attempt is made to reduce the length of the real-image finder optical system of this type in the front-to-back direction, there is a need to shorten the focal length of the objective optical system, since the objective optical system occupies the majority of the overall length of the finder optical system. On the other hand, the length of the eye relief, which is the degree of ease for viewing through the eyepiece lens element (eyepiece optical system), is proportional to the focal length of eyepiece lens element (eyepiece optical system). As a result, there is a limit to shorten the focal length of the eyepiece lens element (eyepiece optical system) while an acceptable eye relief is maintained.

Accordingly, if an attempt is made to further miniaturize a conventional real-image finder optical system, the focal lengths of both objective optical system and eyepiece lens element (eyepiece optical system) have to be reduced. Consequently, the eye relief becomes shorter, so that ease for viewing may not properly be secured. Still further, the focal length of the objective optical system becomes excessively short with respect to the focal length of the eyepiece lens element (eyepiece optical system), thereby the finder magnification (fo/fe; fo: the focal length of the objective optical system; fe: the focal length of the eyepiece lens element (eyepiece optical system)) decreases, and it becomes difficult for an operator to view an object image, and the quality of the object image may deteriorate.

In addition, in order to superimpose finder-field information, such as the field frame, the distance-measuring frame and so forth, onto the object image, a display member which is constituted by a transparent member having the finder field information formed thereon is provided in the vicinity of the object image formed by the objective optical system. However, in a conventional real-image finder optical system, dust and scratches on the surface of the transparent member would also appear with the object image. Particularly, in the case where the focal length of the eyepiece optical system is set to be short, such dust and scratches are enlarged, which may obstruct the field of view.

SUMMARY OF THE INVENTION

It is an object of the present invention to provide a small-sized real-image finder optical system which has a high finder magnification, and has a long eye relief.

Another object of the present invention is to provide a small-sized real-image finder optical system in which dust and scratches are not noticeable when an object is viewed through the finder optical system.

In order to achieve the above-mentioned objects, there is provided a real-image finder optical system including a positive objective optical system, an erecting optical system, and a positive eyepiece optical system, thereby an object image, which is formed by the objective optical system, and is upside down and reversed from left to right, is reinverted by the erecting optical system to the proper orientation. The erecting optical system includes a plurality of reflection surfaces, at least one of which is provided along an optical path on the object side with respect to the object image, and at least another of which is provided along an optical path on the eyepiece side with respect to the object image. The eyepiece optical system includes a positive lens element which has a transverse magnification of more than 1.0, and is provided between the object image and the reflection surface provided along an optical path on the eyepiece side with respect to the object image.

The positive lens element satisfies the following condition (1), and preferably condition (1'):

$$1.05 < mp < 2 \quad (1)$$

$$1.2 < mp < 2 \quad (1')$$

wherein mp designates the transverse magnification of the positive lens element of the eyepiece optical system.

The real-image finder optical system preferably satisfies the following condition:

$$0.4 < fp/feL < 0.8 \quad (2)$$

wherein fp designates the focal length of the positive lens element; and feL designates the focal length of the optical system (excluding the positive lens element) on the eyepiece side with respect to the positive lens element.

At least one surface of the positive lens element is an aspherical surface which satisfies the following condition:

$$0.0005 < (\Delta\alpha pii - \Delta\alpha pi)/fe < 0.01 \quad (3)$$

wherein $\Delta\alpha pi$ designates the amount of asphericity on the object-side surface of the positive lens element, and at a position of 0.12×feL from the optical axis;

$\Delta\alpha pii$ designates the amount of asphericity on the eyepiece-side surface of the positive lens element, and at a position of 0.12×feL from the optical axis;

fe designates the focal length of the optical system on the eyepiece side with respect to the object image.

The amount of asphericity is defined by the following formula:

$$\Delta\alpha = \Delta Sasp - \Delta Ssph$$

wherein:

$$\Delta Sasp = Ch^2/(1 + [1\{1+K\}C^2h^2]^{1/2}) + A4h^4 + A6h^6 + A8h^8$$

$$\Delta Ssph = Ch^2/(1 + [1 - C^2h^2]^{1/2})$$

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient; and

A8 designates a eighth-order aspherical coefficient.

The erecting optical system includes a reflection surface provided on the object side with respect to the object image, and three reflection surfaces provided on the eyepiece side with respect to the object image. These three reflection surfaces can be constituted by a prism.

On the other hand, in the erecting optical system, two reflection surfaces can be provided on the object side with respect to the object image so that these surfaces constitute a roof reflection surface. In this case, other two reflection surfaces are preferably provided on the eyepiece side with respect to the object image. These two reflection surfaces on the eyepiece side can be constituted by a pentagonal prism.

Moreover, the positive lens element of the eyepiece optical system can be integrally formed on an incident surface of the prism.

In order to indicate finder-field information in the finder view field, a transparent member on which the finder-field information is formed can be provided in the vicinity of the object image. In this case, the space between the positive lens element and the transparent member is air-tightly sealed to protect the transparent member from dust, scratches and the like. Furthermore, the transparent member can be a condenser lens.

Furthermore, in order to achieve the above-mentioned objects, there is provided a real-image finder optical system including a positive objective optical system, an erecting optical system, and a positive eyepiece optical system, thereby an object image, which is formed by the objective optical system, and is upside down and reversed from left to right, is reinverted by the erecting optical system to the proper orientation. The objective optical system includes a negative lens element which has a transverse magnification of more than 1.0, and is provided on the object side with respect to the object image. The eyepiece optical system includes a positive lens element which has a transverse magnification of more than 1.0, and is provided on the eyepiece side with respect to the object image.

In the above real-image finder optical system with the negative and positive lens elements, an object image, formed through an optical system on the object side with respect to the negative lens element, is magnified by the negative lens element, and the magnified object image is arranged to be further magnified by the positive lens element provided on the eyepiece side with respect to the object image; and the further magnified object image is viewed through the eyepiece optical system.

The negative lens element of the objective optical system preferably satisfies the following condition:

$$1.05 < mn < 2 \quad (4)$$

wherein mn designates the transverse magnification of the negative lens element of the objective optical system.

Furthermore, the positive lens element of the eyepiece optical system can satisfy the following condition:

$$1.2 < mp < 2 \quad (1')$$

wherein mp designates the transverse magnification of the positive lens element of the eyepiece optical system.

Still further, in order to achieve the above-mentioned objects, there is provided a real-image finder optical system including a positive objective optical system, an erecting optical system, and a positive eyepiece optical system, thereby an object image, which is formed by the objective optical system, and is upside down and reversed from left to right, is reinverted by the erecting optical system to the proper orientation. The objective optical system includes a negative lens element which has a transverse magnification of more than 1.0, and is provided on the object side with respect to the object image.

In the above real-image finder optical system with the negative lens element, an object image, formed through an optical system on the object side with respect to the negative lens element, is magnified by the negative lens element, and is viewed through the eyepiece optical system.

The negative lens element of the objective optical system preferably satisfies the following condition:

$$1.05 < mn < 2 \quad (4)$$

wherein mn designates the transverse magnification of the negative lens element of the objective optical system.

The erecting optical system includes a plurality of reflection surfaces, at least one of which is respectively provided on the following places:

(i) along an optical path on the object side with respect to the negative lens element;

(ii) between the negative lens element and the position where the object image is formed; and (iii) along an optical path on the eyepiece side with respect to object image.

The reflection surface which is provided along the optical path on the eyepiece side with respect to object image can be constituted by a prism.

Moreover, in the erecting optical system, two reflection surfaces, which are provided (i) along the optical path on the side of object with respect to the negative lens element, or (ii) between the negative lens element and the place where the object image is formed, can be constituted by a roof reflection surface having two reflection surfaces. In this case, other two reflection surfaces can be provided on the eyepiece side with respect to the object image by the objective optical system. These two reflection surfaces on the eyepiece side can be formed by a pentagonal prism.

Throughout the disclosure, the eyepiece optical system is defined as an optical system from the primary image forming plane (object image) towards the eyepiece side (an operator's eye side), and the eyepiece lens element is equivalent to an eyepiece which is provided on the eyepiece side with respect to the entire erecting optical system.

The present disclosure relates to subject matters contained in Japanese Patent Applications No. Hei-11-318223 (filed on Nov. 9, 1999), No. Hei-11-371584 (filed on Dec. 27, 1999) and No. 2000-18786 (filed on Jan. 27, 2000) which are expressly incorporated herein by reference in their entirety.

BRIEF DESCRIPTION OF THE DRAWINGS

The invention will be discussed below in detail with reference to the accompanying drawings, in which:

FIGS. 8A, 8B, 8C and 8D show aberrations, at the short focal length extremity, occurred in the optical arrangement shown in FIG. 7;

FIGS. 9A, 9B, 9C and 9D show aberrations, at the long focal length extremity, occurred in the optical arrangement shown in FIG. 7;

FIGS. 11A, 11B, 11C and 11D show aberrations, at the short focal length extremity, occurred in the optical arrangement shown in FIG. 10;

FIGS. 12A, 12B, 12C and 12D show aberrations, at the long focal length extremity, occurred in the optical arrangement shown in FIG. 10;

FIGS. 14A, 14B, 14C and 14D show aberrations, at the short focal length extremity, occurred in the optical arrangement shown in FIG. 13;

FIGS. 15A, 15B, 15C and 15D show aberrations, at the long focal length extremity, occurred in the optical arrangement shown in FIG. 13;

FIGS. 25A, 25B, 25C and 25D show aberrations, at the short focal length extremity, occurred in the optical arrangement shown in FIG. 24;

FIGS. 26A, 26B, 26C and 26D show aberrations, at the long focal length extremity, occurred in the optical arrangement shown in FIG. 24;

FIGS. 31A, 31B, 31C and 31D show aberrations, at the short focal length extremity, occurred in the optical arrangement shown in FIG. 30;

FIGS. 32A, 32B, 32C and 32D show aberrations, at the long focal length extremity, occurred in the optical arrangement shown in FIG. 30;

FIGS. 34A, 34B, 34C and 34D show aberrations, at the short focal length extremity, occurred in the optical arrangement shown in FIG. 33;

FIGS. 35A, 35B, 35C and 35D show aberrations, at the long focal length extremity, occurred in the optical arrangement shown in FIG. 33;

FIGS. 37A, 37B, 37C and 37D show aberrations, at the short focal length extremity, occurred in the optical arrangement shown in FIG. 36;

FIGS. 38A, 38B, 38C and 38D show aberrations, at the long focal length extremity, occurred in the optical arrangement shown in FIG. 36;

FIGS. 40A, 40B, 40C and 40D show aberrations, at the short focal length extremity, occurred in the optical arrangement shown in FIG. 39; and FIGS. 41A, 41B, 41C and 41D show aberrations, at the long focal length extremity, occurred in the optical arrangement shown in FIG. 39.

FIGS. 43A, 43B, 43C and 43D show aberrations, at the short focal length extremity, occurred in the optical arrangement shown in FIG. 42;

FIGS. 44A, 44B, 44C and 44D show aberrations, at the long focal length extremity, occurred in the optical arrangement shown in FIG. 42;

FIGS. 46A, 46B, 46C and 46D show aberrations, at the short focal length extremity, occurred in the optical arrangement shown in FIG. 45;

FIGS. 47A, 47B, 47C and 47D show aberrations, at the long focal length extremity, occurred in the optical arrangement shown in FIG. 45;

FIGS. 49A, 49B, 49C and 49D show aberrations, at the short focal length extremity, occurred in the optical arrangement shown in FIG. 48;

FIGS. 50A, 50B, 50C and 50D show aberrations, at the long focal length extremity, occurred in the optical arrangement shown in FIG. 48;

FIGS. 52A, 52B, 52C and 52D show aberrations, at the short focal length extremity, occurred in the optical arrangement shown in FIG. 51;

FIGS. 53A, 53B, 53C and 53D show aberrations, at the long focal length extremity, occurred in the optical arrangement shown in FIG. 51;

FIGS. 55A, 55B, 55C and 55D show aberrations, at the short focal length extremity, occurred in the optical arrangement shown in FIG. 54;

FIGS. 56A, 56B, 56C and 56D show aberrations, at the long focal length extremity, occurred in the optical arrangement shown in FIG. 54;

FIGS. 58A, 58B, 58C and 58D show aberrations, at the short focal length extremity, occurred in the optical arrangement shown in FIG. 57; and FIGS. 59A, 59B, 59C and 59D show aberrations, at the long focal length extremity, occurred in the optical arrangement shown in FIG. 57.

DESCRIPTION OF THE PREFERRED EMBODIMENTS

Figure 1:
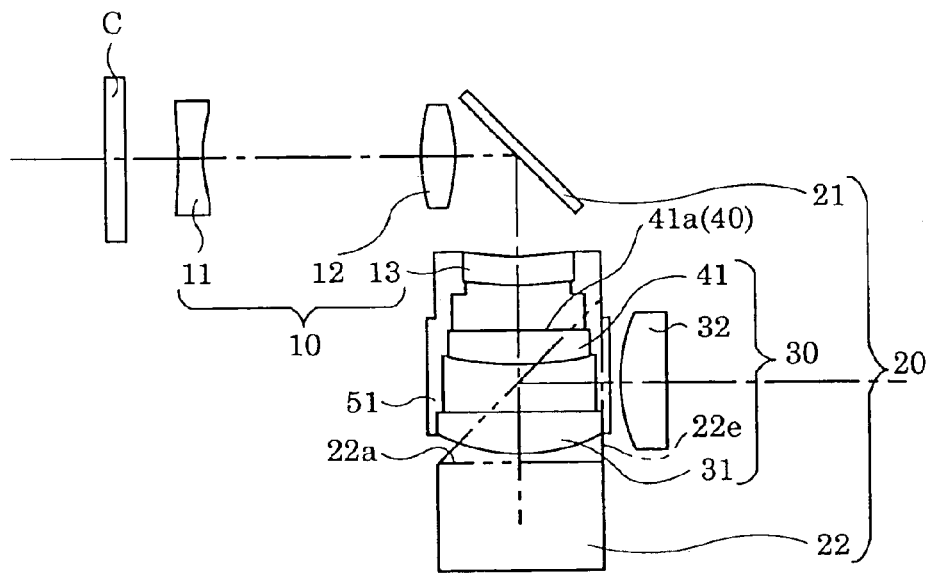
FIG. 1 is a plan view of a first embodiment of a real-image finder optical system according to the present invention.

In a real-image finder optical system according to the first to sixth embodiments, one reflection surface is provided on the object side with respect to the object image formed by an object optical system. An optical axis which is reflected by the reflection surface is deflected at a right-angle with respect to an optical axis being incident thereon. Further, the object image formed by the objective optical system is magnified by a positive lens element, which has a transverse magnification of more than 1.0, and is positioned on the eyepiece side with respect to the object image, thereby a high finder magnification can be obtained.

In a real-image finder optical system according to the seventh to twelfth embodiments, (i) the eyepiece optical system is provided with the above-described positive lens element, which has a transverse magnification of more than 1.0, and is positioned on the eyepiece side with respect to the object image, and (ii) the objective optical system is provided with a negative lens element having a magnification of more than 1.0 in front of the object image formed by the objective optical system. According to the real-image finder optical system with the positive and negative lens elements provided respectively in the eyepiece optical system and the objective optical system, an object image formed on the object side with respect to the negative lens element is magnified by the negative lens element, and the magnified object image is further magnified by the positive lens element provided on the eyepiece side with respect to the object image, thereby a higher finder magnification can be obtained.

In a real-image finder optical system according to the thirteenth to eighteenth embodiments, (i) the objective optical system is provided with a negative lens element having a magnification of more than 1.0 just in front of the object image formed by the objective optical system, and (ii) the positive lens element of the eyepiece optical system is eliminated. According to the real-image finder optical system with the negative lens element, an image of an object, formed by an optical system on the object side with respect to the negative lens element, can be magnified by the negative lens element, thereby a high finder magnification can be obtained.

According to these arrangements, the focal length of the eyepiece lens element can be set to the extent that an appropriate eye relief is secured; and the focal length of the objective optical system, and the focal length of the optical system on the object side with respect to the negative lens element, can be shortened while a high finder magnification is maintained. Consequently, the overall length of the objective optical system can be made shorter without sacrificing ease for viewing through the eyepiece lens element (eyepiece optical system) and the quality of the object image; and mainly due to the effect of deflecting the optical axis of the objective optical system, the front-to-back length of the finder optical system can further be reduced.

Figure 2:
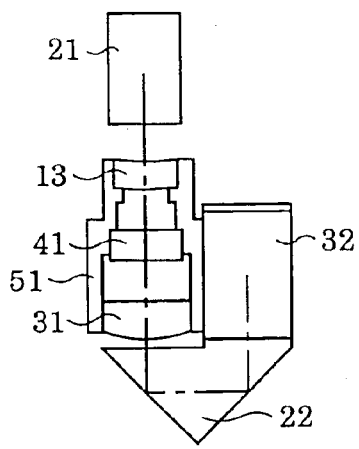
FIG. 2 is a rear view of FIG. 1.
Figure 3:
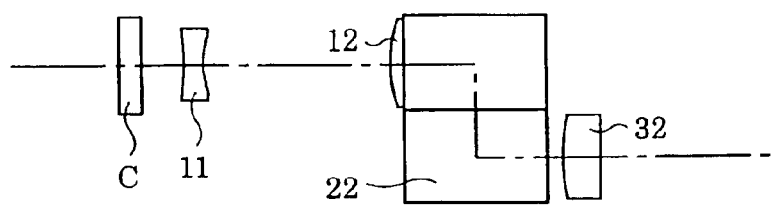
FIG. 3 is a side view of FIG. 1.
Figure 4:
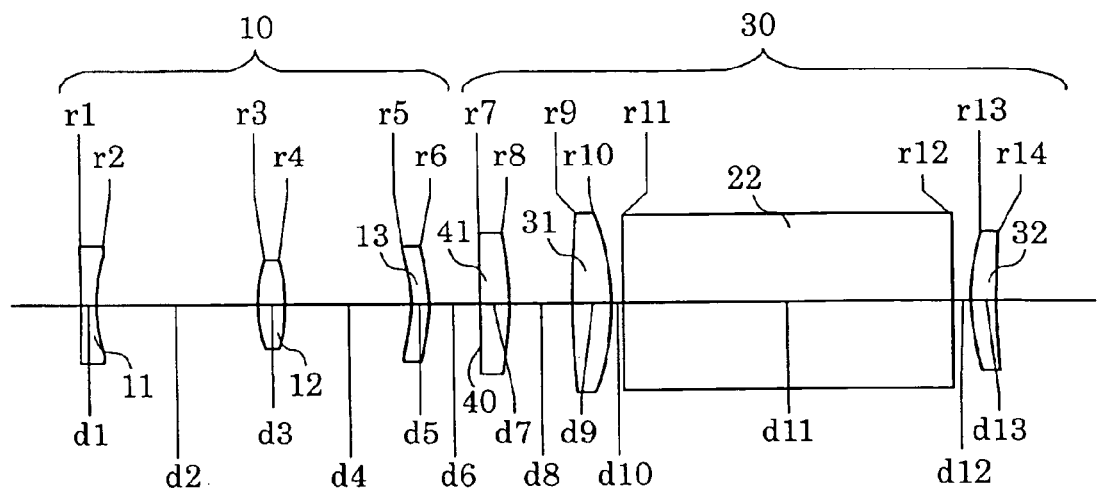
FIG. 4 shows the optical arrangement according to a first embodiment, in which the reflection surfaces shown in FIGS. 1 to 3 are shown as developed views.

FIGS. 1 through 4 show the first embodiment of the real-image finder optical system. FIGS. 1 through 3 show three elevations showing the positions of the optical elements, and FIG. 4 shows the developed view of the optical elements. The real-image finder optical system includes a cover glass C, an objective optical system 10, a planoconvex lens element 41 (transparent member; condenser lens), a biconvex lens 31 (a positive lens element having a transverse magnification of more than 1), a prism 22 having three reflection surfaces, and an eyepiece lens element 32 which is constituted by a positive meniscus lens element, in this order from the object.

The objective optical system 10 includes a biconcave first lens element 11, a biconvex second lens element 12, and a third lens element 13 constituted by a positive meniscus lens element, in this order from the object. A plane mirror (reflection surface) 21 is provided between the second lens element 12 and the third lens element 13. The optical axis of the objective optical system 10 is deflected at a right angle by the plane mirror 21. The objective optical system 10, as a whole, has positive power, and forms an object image on the imaging plane 40. In the vicinity of the imaging plane 40, a planoconvex lens element (condenser lens) 41 is provided so that an incident surface 41a thereof coincides with the imaging plane 40. Furthermore, an incident surface 22a of the prism 22 faces the biconvex lens element 31, and an exit surface 22e thereof faces the eyepiece lens element 32.

The objective optical system 10 forms an object image which is upside down and reversed from left to right, and the inverted object image is erected to the proper orientation by the plane mirror 21 and the prism 22. Subsequently, the erected object image is viewed through the eyepiece lens element 32. In other words, the plane mirror 21 and the three surfaces of the prism 22, i.e., four reflection surfaces constitute an erecting optical system 20.

The object image formed on the imaging plane 40 by the objective optical system 10 is magnified by the biconvex lens element 31, and is viewed through the eyepiece lens element 32. In other words, the biconvex lens element 31 and the eyepiece lens element 32 constitute the eyepiece optical system 30.

In the arrangement shown in FIGS. 1 through 3, the optical axis of the objective optical system 10 is deflected at a right angle by the plane mirror 21, and the focal length of the objective optical system 10 is set to be short, thereby the distance between the first lens element 11 and the plane mirror 21 is made short. Consequently, the length of the entire finder optical system is shortened in the front-to-back direction. If the focal length of the objective optical system 10 is made shorter, the object image formed on the imaging plane 40 by the objective optical system 10 becomes smaller. However, since the finder image viewed through the eyepiece lens element 32 is magnified by the biconvex lens element 31 provided between the imaging plane 40 and the prism 22, a high finder magnification can still be obtained even though the focal length of the objective optical system 10 is short.

Furthermore, according to this arrangement, since a high finder magnification can be obtained without shortening the focal length of the eyepiece lens element 32, an appropriate eye relief can be maintained. Consequently, a small-sized real-image finder optical system, which is easy to view through, and has a high finder magnification, can be obtained.

Furthermore, as shown in FIG. 1, the incident surface 41a of the planoconvex lens element 41 is a flat surface, and is positioned so that the incident surface 41a coincides with the imaging plane 40 on which the object image formed by the objective optical system 10 is formed. On the incident surface 41a, finder-field information, such as the field frame, a distance-measuring frames and so forth, is provided thereon. The finder-field information is superimposed onto the object image, and simultaneously viewed through the eyepiece lens element 32.

Upon viewing this object image, dust and scratches on a lens surface in the vicinity of the object image are also magnified and viewed through the eyepiece lens element 32. As shown in FIG. 1, the space between the exit surface of the third lens element 13 and the incident surface of the biconvex lens element 31, which face towards each other, is sealed by a lens retaining member 51. According to this arrangement, the retaining member 51 can prevent dust and scratches from attaching onto the incident surface of the biconvex lens element 31, and onto the exit surface of the third lens element 13 which is in the vicinity of the imaging plane 40. Therefore a real-image finder optical system, through which dust and scratches are not noticeable, can be obtained.

A real-image finder optical system in general is arranged to lead a diverging bundle of rays from the exit pupil of the objective optical system to the eyepiece optical system through the erecting optical system. Therefore the farther the distance from the exit pupil of the objective optical system is, the larger the bundle of rays therefrom is diverged. Consequently the erecting optical system and the eyepiece optical system have to be made larger in size. In order to prevent such an increase in size thereof, it has been know to provide a positive condenser lens element for reducing the divergence of the bundle of rays, in the vicinity of the position where an object image is formed. However, if the power of the condenser lens element is too strong, the exit pupil formed at the rear-side of the eyepiece optical system too much closely approaches the eyepiece optical system, so that the finder becomes difficult to view through. Accordingly, there is a need to provide the condenser lens element with appropriate power.

According to the eyepiece optical system shown in FIG. 1, the positive (biconvex) lens element 31 having a transverse magnification of more than 1.0 is provided between the object image and the reflection surface provided on the eyepiece side with respect to the object image. It is therefore possible to function the positive lens element 31 as a condenser lens element. On the other hand, it is also possible to reduce aberrations while an appropriate transverse magnification is maintained by the positive lens element. However, appropriate power for a condenser lens element may not be given to the positive lens element 31. In this case, in addition to the positive lens element 31, it is preferable to provide a condenser lens element in the vicinity of the object image. In FIG. 1, the planoconvex lens element 41 functions as a condenser lens element.

Figure 22:
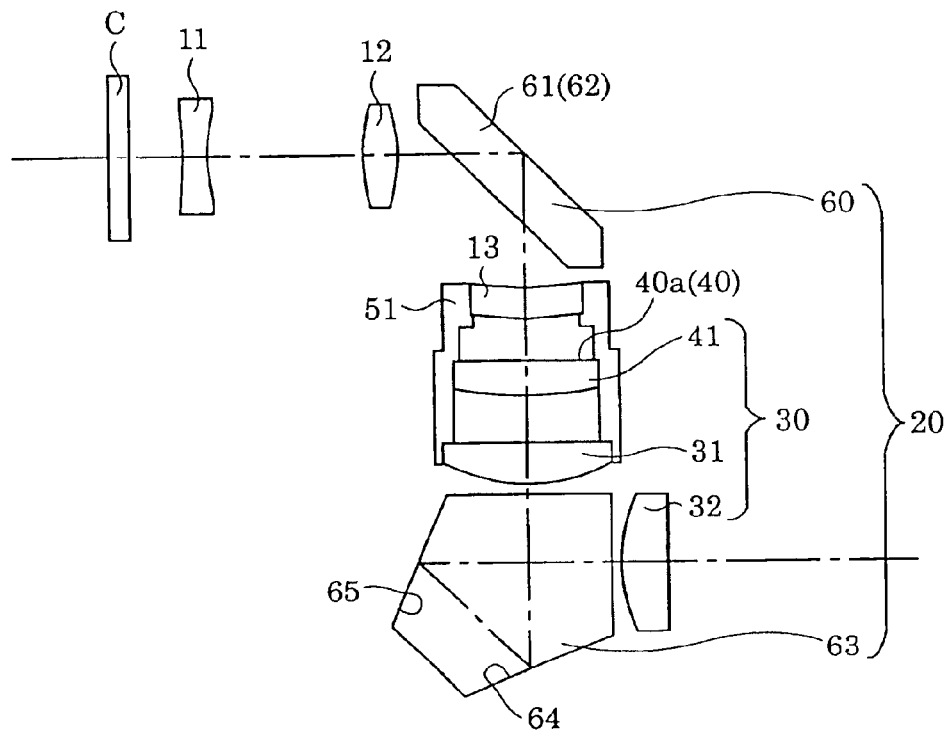
FIG. 22 is a plan view of the erecting optical system constituted by a roof mirror and a pentagonal prism.

In FIG. 1, the erecting optical system 20 is constituted by the combination of the plane mirror 21 and the prism 22 having three reflection surfaces; however, the arrangement is not limited thereto. For example, a combination of a roof mirror (roof reflection surface) and a pentagonal prism (two reflection surfaces) may be employed. FIG. 22 shows such an example. Unlike the arrangement shown in FIG. 1, the erecting optical system 20 includes a roof prism 60 having two reflection surfaces 61 and 62 which are provided on the object side with respect to the object image, and a pentagonal prism 63 having reflection surfaces 64 and 65 which are provided on the eyepiece side with respect to the object image. The remaining arrangement is the same as the real-image finder optical system shown in FIG. 1. In FIG. 22, the components which are the same as the ones in FIG. 1 are designated with the same reference numerals.

As explained, in the case where a part of the erecting optical system 20 is constituted by the roof mirror 60, even if the optical axis incident on the roof prism 60 and the optical axis reflected therefrom are on the same plane, the upside-down of an object image can be inverted. Consequently, the size of the finder optical system can be reduced in the up-to-bottom direction, by which the up-to-bottom dimension of a camera can be reduced in addition to the thickness (length from front to back) thereof.

Figure 23:
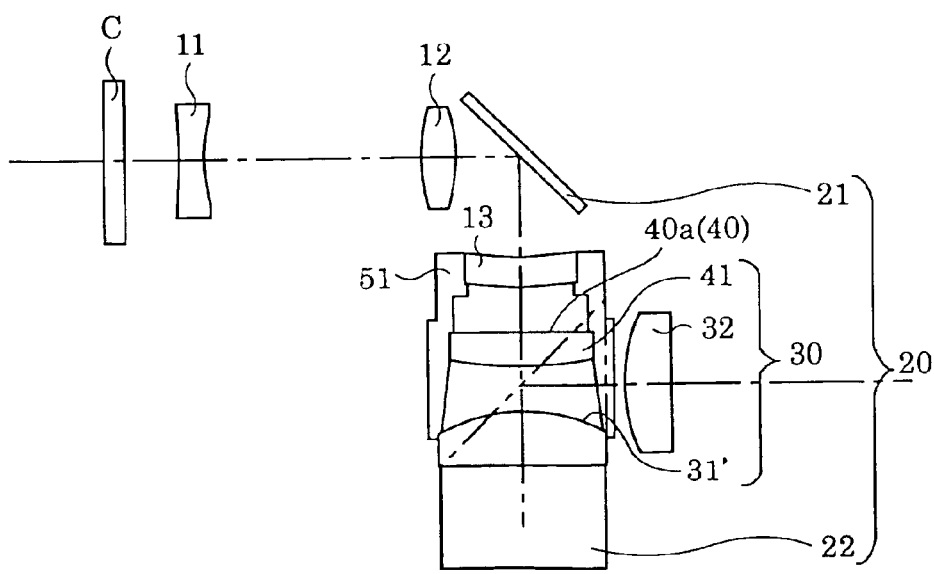
FIG. 23 is a plan view of an arrangement in which the positive lens element is integrally formed with an incident surface of the prism.

Furthermore, the reflection surfaces provided on the eyepiece side with respect to the imaging plane 40 are not necessarily limited to a prism. For example, a combination of mirrors can be employed. Even so, it should be understood that the reflection surfaces of the prism can be utilized as total reflection surfaces, thereby a bright finder view field without losing luminous quantities can effectively be obtained. Still further, if the effective apertures are the same, the arrangement shown in FIG. 1, i.e., the prism 22 provided between the biconvex lens element 31 and the eyepiece lens element 32, can make the focal length of the eyepiece lens element 32 shorter than an arrangement, in which the prism 22 is replaced with three plane mirrors, since a prism can make the optical path length shorter than a combination of mirrors can, thereby a much higher finder magnification can easily be obtained. Moreover, in the case where a prism is employed, the positive lens element 31 can be integrally formed on the incident surface of the prism. As shown in FIG. 23, a positive lens element 31, is integrally formed on the incident surface of the prism 22.

The conditions (1) to (4) will be discussed.

Condition (1) specifies the magnification ratio (transverse magnification) of the positive lens element 31 which magnifies the object image, and is provided between the object image and the reflection surface provided on the eyepiece side with respect to the object image.

If mp exceeds the lower limit of condition (1), the magnification ratio of the object image becomes insufficient, thereby a high finder magnification cannot be obtained, and the eye relief becomes short.

If mp exceeds the upper limit of condition (1), the magnification ratio of the object image becomes too high, thereby even minute scratches and dust which are on the surfaces of lens elements and the like provided in the vicinity of the object image are also magnified to the extent that such scratches and dust become visible.

Condition (1') specifies the transverse magnification of the positive lens element 31 so that the effect of magnifying the object image formed by the objective optical system is much more enchanced.

If mp exceeds the lower limit of condition (1'), a sufficiently high finder magnification cannot be obtained and an appropriate eye relief cannot be obtained.

If mp exceeds the upper limit of condition (1'), the magnification ratio of the object image becomes too high similar to the case of condition (1), thereby even minute scratches and dust which are on the surfaces of lens elements and the like provided in the vicinity of the object image are magnified to the extent that such scratches and dust become visible.

In the positive lens element 31 which satisfies condition (1) or (1'), the power thereof tends to be too strong, which causes spherical aberration, coma and distortion.

In order to prevent; the excessive occurrences of spherical aberration, coma, distortion and the like, condition (2) specifies an optimum power ratio of the positive lens element 31 to the optical system (the eyepiece lens element) on the eyepiece side with respect to the positive lens element 31. In other words, according to condition (2), the power of the positive lens element 31, which contributes to the focal length of the eyepiece optical system (mp×feL; mp: the transverse magnification of the positive lens element 31; feL: the focal length of the eyepiece lens element), is made comparatively weak, thereby spherical aberration, coma, distortion and the like can be prevented.

If fp/feL exceeds the lower limit of condition (2), the power of the positive lens element 31 becomes too strong, thereby spherical aberrations, coma, distortion and the like excessively occur.

If fp/feL exceeds the upper limit of condition (2), the power of the positive lens element 31 becomes too weak, thereby the transverse magnification thereof cannot be sufficiently increased.

Condition (3) specifies the configuration an aspherical surface formed on the positive lens element 31. The positive lens element 31 is provided with an appropriate power according to condition (2), so that the occurrences of aberrations are adequately reduced. Therefore according to the configuration of the aspherical surface defined in condition (3), the correcting of spherical aberrations, coma, distortion and the like can more effectively be made. In the embodiments, the positive lens element 31 is designed to have the most effective asphericity at about 60% of the maximum effective aperture thereof. Furthermore, since the positive lens element 31 is provided relatively close to the object image formed by the objective optical system, the maximum effective aperture hp can be approximately defined as follows:

$$hp = feL \times \tan \beta$$

wherein feL designates the focal length of the optical system on the eyepiece side with respect to the positive lens element; and β designates the apparent visual angle.

Moreover, since the apparent visual angle β for the finder optical system of the camera is about 11° in general, the amount of asphericity at the position, from the optical axis, defined by 0.6×feL×tan(11)≈0.12×feL is important.

If (Δαpii−Δαpi)/fe exceeds the lower limit of condition (3), the amount of asphericity on the aspherical surface of the positive lens element 31 becomes too small, so that the correcting of spherical aberration, coma, distortion and the like cannot sufficiently be made.

If (Δαpii−Δαpi)/fe exceeds the upper limit of condition (3), the amount of asphericity on the aspherical surface of the positive lens element 31 becomes too large, so that spherical aberration, coma, distortion and the like are over-corrected.

Condition (4) relates to the negative lens element 13 which is provided on the object side with respect to the position where the object image formed by the objective optical system is formed. More concretely, condition (4) specifies a magnification ratio (transverse magnification) of the negative lens element to magnify an image formed on an optical system (excluding the negative lens element) on the object side with respect to the negative lens element.

If mn exceeds the lower limit of condition (4), the magnification ratio of the negative lens element 13 becomes insufficient, thereby a high finder magnification cannot be obtained, and the eye relief becomes short.

If mn exceeds the upper limit of condition (4), an object image magnified by the negative lens element 13 becomes too large, so that the eyepiece optical system has to be made larger in size.

Specific numerical data of the embodiment's will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the solid line and the two types of dotted lines respectively indicate magnification with respect to the d, g and C lines. S designates the sagittal image, and M designates the meridional image. Furthermore, in the aberration diagrams, ER designates the diameter of the exit pupil (mm), and B designates the emitting angle (apparent visual angle) (°). In the tables, S.F.L.E. designates the short focal length extremity, L.F.L.E. designates the long focal length extremity, fo designates the focal length of the objective optical system, r designates the radius of curvature, d designates the lens-element thickness or distance between lens elements, Nd designates the refractive index at the d-line, and ν designates the Abbe number.

In addition to the above, an aspherical surface which is symmetrical with respect to the optical axis is defined as follows:

$$x = cy^2/(1+[-\{1+K\}c^2y^2]^{1/2}) + A4y^4 + A6y^6 + A8y^8 + A10y^{10}$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIG. 1 is a plan view of the first embodiment of the real-image finder optical system. FIG. 2 is a rear view of FIG. 1. FIG. 3 is a side view of FIG. 1. FIG. 4 shows the optical arrangement of the real-image finder optical system, in which the reflection surfaces shown in FIGS. 1 to 3 are shown as developed views. FIGS. 5A through 5D show aberrations, at the short focal length extremity, occurred in the optical arrangement shown in FIG. 4. FIGS. 6A through 6D show aberrations, at the long focal length extremity, occurred in the optical arrangement shown in FIG. 4. Table 1 shows the numerical data of the first embodiment.

TABLE 1

|  | S.F.L.E. |  | L.F.L.E. |  |
|---|---|---|---|---|
| Finder Magnification (fo/fe) Diopter [dptr] = −1.0 | 0.39 | — | 1.06 |  |

| Surface No. | r | d | Nd | ν |
|---|---|---|---|---|
| 1* | −29.424 | 1.30 | 1.58547 | 29.9 |
| 2* | 10.880 | 13.49–2.620 | — | — |
| 3* | 8.000 | 2.20 | 1.49176 | 57.4 |

TABLE 1-continued

| 4 | −13.146 | 10.76–21.840 | — | — |
| 5* | −16.020 | 1.50 | 1.49176 | 57.4 |
| 6 | −13.113 | 4.30 | — | — |
| 7 | ∞ | 2.50 | 1.49176 | 57.4 |
| 8 | −31.240 | 5.46 | — | — |
| 9 | 62.258 | 3.32 | 1.49176 | 57.4 |
| 10* | −12.638 | 0.92 | — | — |
| 11 | ∞ | 28.00 | 1.49176 | 57.4 |
| 12 | ∞ | 1.50 | — | — |
| 13* | 18.345 | 2.50 | 1.49176 | 57.4 |
| 14 | 548.071 | — | — | — |

*designates the aspherical surface which is rotationally symmetrical with respect to the optical axis.

Aspherical surface data (the aspherical surface coefficients not indicated are zero (0.00))

| Surface No. | K | A4 | A6 |
|---|---|---|---|
| 1 | 0.00 | $0.3900 \times 10^{-3}$ | $-0.5090 \times 10^{-5}$ |
| 2 | 0.00 | $0.2100 \times 10^{-4}$ | $0.5050 \times 10^{-5}$ |
| 3 | 0.00 | $-0.6030 \times 10^{-3}$ | $-0.4500 \times 10^{-6}$ |
| 5 | 0.00 | $-0.1372 \times 10^{-2}$ | $0.7400 \times 10^{-5}$ |
| 10 | 0.00 | $0.1360 \times 10^{-3}$ | $-0.1660 \times 10^{-6}$ |
| 13 | 0.00 | $-0.1160 \times 10^{-4}$ | $-0.4480 \times 10^{-6}$ |

[Embodiment 2]

Figure 7:
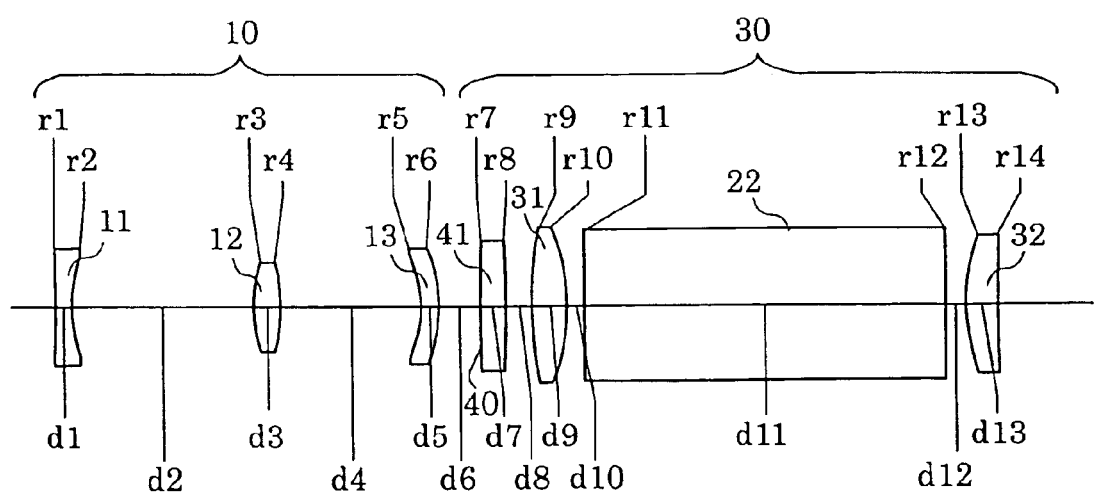
FIG. 7 shows the optical arrangement according to a second embodiment, in which the reflection surfaces of a real-image finder optical system are shown as developed views.
Figure 5A:
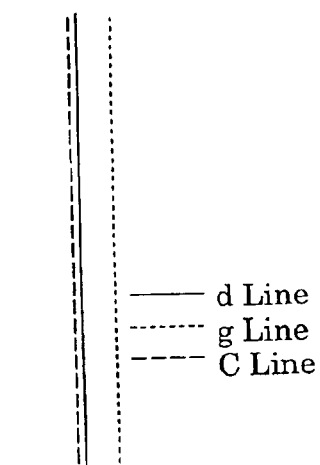
FIGS. 5A, 5B, 5C and 5D show aberrations, at the short focal length extremity, occurred in the optical arrangement shown in FIG. 4.
Figure 5B:
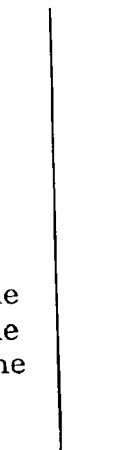
Figure 5C:
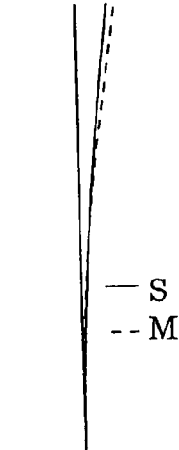
Figure 5D:
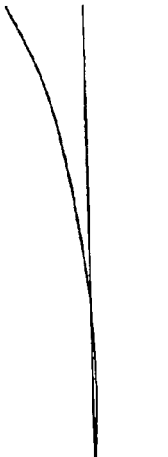
Figure 6A:
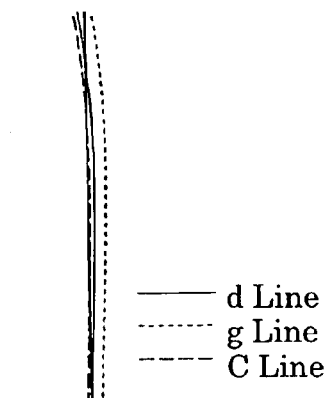
FIGS. 6A, 6B, 6C and 6D show aberrations, at the long focal length extremity, occurred in the optical arrangement shown in FIG. 4.
Figure 6B:
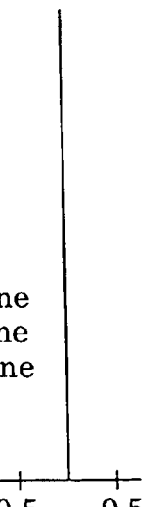
Figure 6C:
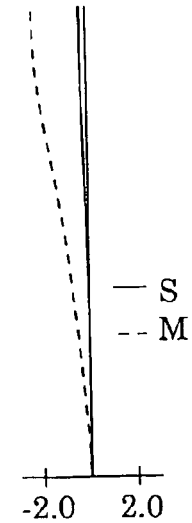
Figure 6D:
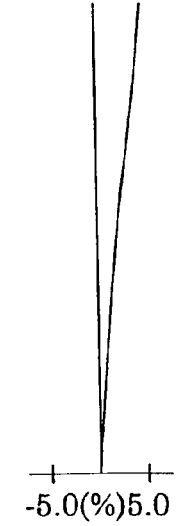

FIG. 7 shows the optical arrangement, according to the second embodiment, in which the reflection surfaces of a real-image finder optical system are shown as developed views. The optical arrangement of the second embodiment is the same as the first embodiment except that (i) surface Nos. 7 and 8 indicates a plane-parallel plate 41', and (ii) the position where the object image by the objective optical system is formed is the eyepiece-side plane of the plane-parallel plate 41', i.e., surface No. 8. FIG. 8A through 8D show aberrations, at the short focal length extremity, occurred in the optical arrangement shown in FIG. 7. FIGS. 9A through 9D show aberrations, at the long focal length extremity, occurred in the optical arrangement shown in FIG. 7. Table 2 shows the numerical data of this embodiment.

TABLE 2

|  | S.F.L.E. |  | L.F.L.E. |  |
|---|---|---|---|---|
| Finder Magnification (fo/fe) Diopter [dptr] = −1.0 | 0.39 | — | 1.06 |  |

| Surface No. | r | d | Nd | ν |
|---|---|---|---|---|
| 1* | −30.580 | 1.30 | 1.58547 | 29.9 |
| 2 | 10.953 | 13.80–2.680 | — | — |
| 3* | 8.061 | 2.10 | 1.49176 | 57.4 |
| 4 | −13.422 | 10.80–21.910 | — | — |
| 5* | −11.954 | 1.50 | 1.49176 | 57.4 |
| 6 | −10.000 | 3.12 | — | — |
| 7 | ∞ | 2.00 | 1.49176 | 57.4 |
| 8 | ∞ | 2.00 | — | — |
| 9 | 26.481 | 2.70 | 1.49176 | 57.4 |
| 10* | −11.829 | 1.28 | — | — |
| 11 | ∞ | 28.00 | 1.49176 | 57.4 |
| 12 | ∞ | 1.50 | — | — |
| 13* | 12.620 | 2.50 | 1.49176 | 57.4 |
| 14 | 272.738 | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | $0.3430 \times 10^{-3}$ | $-0.5480 \times 10^{-5}$ |
| 3 | 0.00 | $-0.5750 \times 10^{-3}$ | $-0.2310 \times 10^{-5}$ |
| 5 | 0.00 | $-0.1620 \times 10^{-2}$ | $0.1760 \times 10^{-4}$ |
| 10 | 0.00 | $0.3380 \times 10^{-3}$ | $-0.2640 \times 10^{-5}$ |
| 13 | 0.00 | $-0.8730 \times 10^{-4}$ | $-0.5000 \times 10^{-6}$ |

[Embodiment 3]

Figure 10:
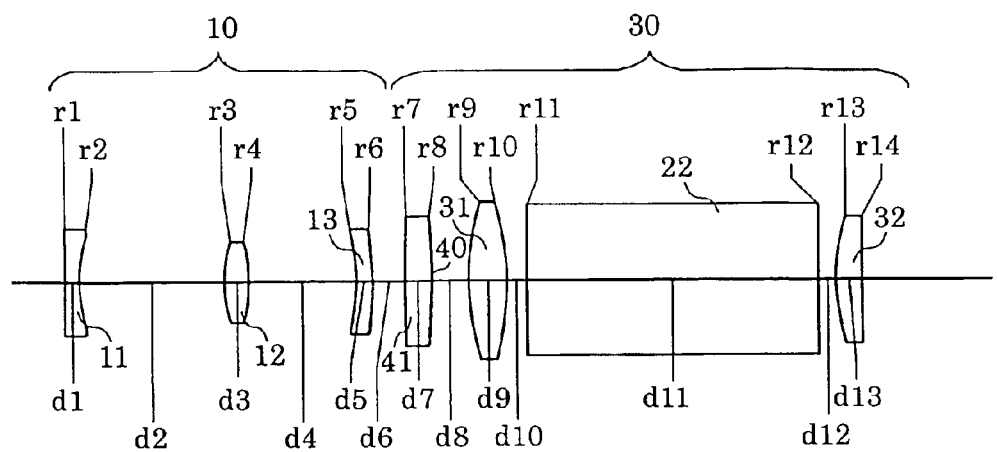
FIG. 10 shows the optical arrangement according to a third embodiment, in which the reflection surfaces of a real-image finder optical system are shown as developed views.

FIG. 10 shows optical arrangement according to the third embodiment, in which the reflection surfaces of a real-image finder optical system are shown as developed views. The optical arrangement of the third embodiment is the same as the first embodiment except that (i) the positive meniscus third lens element 13 (surface Nos. 5 and 6) is replaced with a negative meniscus lens element having a concave surface facing towards the object, (ii) the eyepiece-side surface (No. 8) of the planoconvex lens element 41 (condenser lens: surfaces Nos. 7 and 8) is the flat surface, and (iii) the position where the object image by the objective optical system is formed is the eyepiece-side plane of the planoconvex lens element 41, i.e., surface No. 8. FIGS. 11A through 11D show aberrations, at the short focal length extremity, occurred in the optical arrangement shown in FIG. 10. FIGS. 12A through 12D show aberrations, at the long focal length extremity, occurred in the optical arrangement shown in FIG. 10. Table 3 shows the numerical data of this embodiment.

TABLE 3

| | S.F.L.E. | | L.F.L.E. |
|---|---|---|---|
| Finder Magnification (fo/fe) | 0.39 | — | 1.06 |
| Diopter [dptr] = −1.0 | | | |

| Surface No. | r | d | Nd | ν |
|---|---|---|---|---|
| 1* | −32.081 | 1.30 | 1.58547 | 29.9 |
| 2 | 10.898 | 13.80–2.610 | — | — |
| 3* | 8.000 | 2.10 | 1.49176 | 57.4 |
| 4 | −13.639 | 10.33–21.430 | — | — |
| 5* | −36.318 | 1.50 | 1.49176 | 57.4 |
| 6 | −40.033 | 3.18 | — | — |
| 7 | 45.906 | 2.50 | 1.49176 | 57.4 |
| 8 | ∞ | 3.61 | — | — |
| 9 | 16.519 | 3.50 | 1.49176 | 57.4 |
| 10* | −16.016 | 2.07 | — | — |
| 11 | ∞ | 28.00 | 1.49176 | 57.4 |
| 12 | ∞ | 1.50 | — | — |
| 13* | 11.664 | 2.50 | 1.49176 | 57.4 |
| 14 | 47.677 | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | $0.3730 \times 10^{-3}$ | $-0.6720 \times 10^{-5}$ |
| 3 | 0.00 | $-0.6130 \times 10^{-3}$ | $-0.7360 \times 10^{-6}$ |
| 5 | 0.00 | $-0.1282 \times 10^{-2}$ | $0.1380 \times 10^{-4}$ |
| 10 | 0.00 | $0.2680 \times 10^{-3}$ | $-0.5760 \times 10^{-6}$ |
| 13 | 0.00 | $-0.8260 \times 10^{-4}$ | $-0.7600 \times 10^{-6}$ |

[Embodiment 4]

Figure 13:
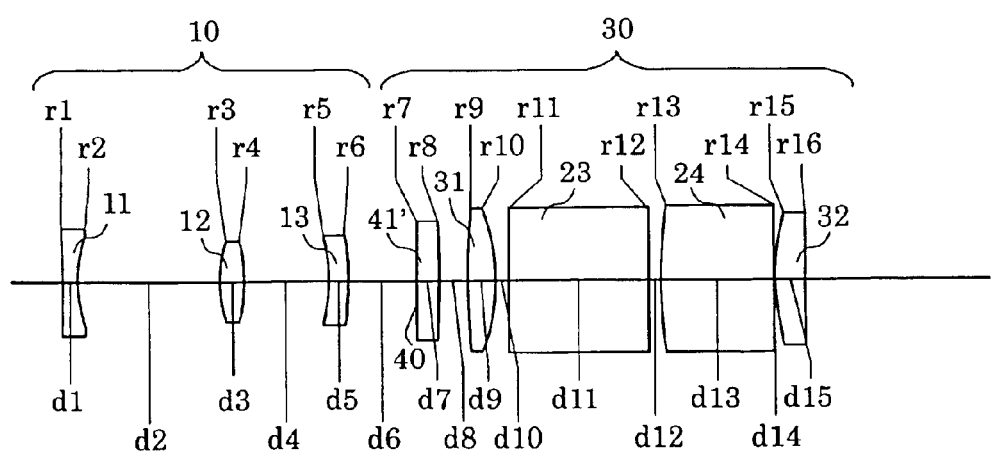
FIG. 13 shows the optical arrangement according to a fourth embodiment, in which the reflection surfaces of a real-image finder optical system are shown as developed views.

FIG. 13 shows the optical arrangement according to the fourth embodiment, in which the reflection surfaces of a real-image finder optical system are shown as developed views. The optical arrangement of the fourth embodiment is the same as the third embodiment except that (i) surface Nos. 7 and 8 indicates a plane-parallel plate 41', (ii) the position where the object image by the objective optical system is formed is the object-side plane of the plane-parallel plate 41', i.e., surface No. 7, (iii) on the eyepiece side with respect to the object image, two separate prisms 23 and 24 are provided, i.e., in the prism 23, two reflection surfaces are used, and in the prism 24, one reflection surface is used, and (iv) the eyepiece lens element 32 (surface Nos. 15 and 16) is a planoconvex lens element. FIGS. 14A through 14D show aberrations, at the short focal length extremity, occurred in the optical arrangement shown in FIG. 13. FIGS. 15A through 15D show aberrations, at the long focal length extremity, occurred in the optical arrangement shown in FIG. 13. Table 4 shows the numerical data of this embodiment.

TABLE 4

| | S.F.L.E. | | L.F.L.E. |
|---|---|---|---|
| Finder Magnification (fo/fe) | 0.39 | — | 1.05 |
| Diopter [dptr] = −1.0 | | | |

| Surface No. | r | d | Nd | ν |
|---|---|---|---|---|
| 1* | −19.320 | 1.30 | 1.58547 | 29.9 |
| 2* | 8.000 | 12.37–3.680 | — | — |
| 3* | 8.000 | 2.00 | 1.49176 | 57.4 |
| 4 | −9.000 | 7.50–17.497 | — | — |
| 5* | −15.817 | 1.80 | 1.49176 | 57.4 |
| 6 | −18.093 | 5.90 | — | — |
| 7 | ∞ | 2.00 | 1.49176 | 57.4 |
| 8 | ∞ | 2.61 | — | — |
| 9 | 70.508 | 2.50 | 1.49176 | 57.4 |
| 10* | −10.000 | 1.10 | — | — |
| 11 | ∞ | 12.50 | 1.49176 | 57.4 |
| 12 | ∞ | 1.10 | — | — |
| 13* | 44.151 | 9.90 | 1.49176 | 57.4 |
| 14 | ∞ | 0.20 | — | — |
| 15* | 15.349 | 2.50 | 1.49176 | 57.4 |
| 16 | ∞ | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | $0.6460 \times 10^{-3}$ | $0.4590 \times 10^{-5}$ |
| 2 | 0.00 | $0.3200 \times 10^{-4}$ | $0.6400 \times 10^{-4}$ |
| 3 | 0.00 | $-0.8183 \times 10^{-3}$ | $0.9980 \times 10^{-5}$ |
| 5 | 0.00 | $-0.1420 \times 10^{-2}$ | $0.1230 \times 10^{-4}$ |
| 10 | 0.00 | $0.1495 \times 10^{-3}$ | $0.2730 \times 10^{-5}$ |
| 13 | 0.00 | $0.1970 \times 10^{-3}$ | — |
| 15 | 0.00 | $-0.2120 \times 10^{-3}$ | $-0.6400 \times 10^{-6}$ |

[Embodiment 5]

Figure 16:
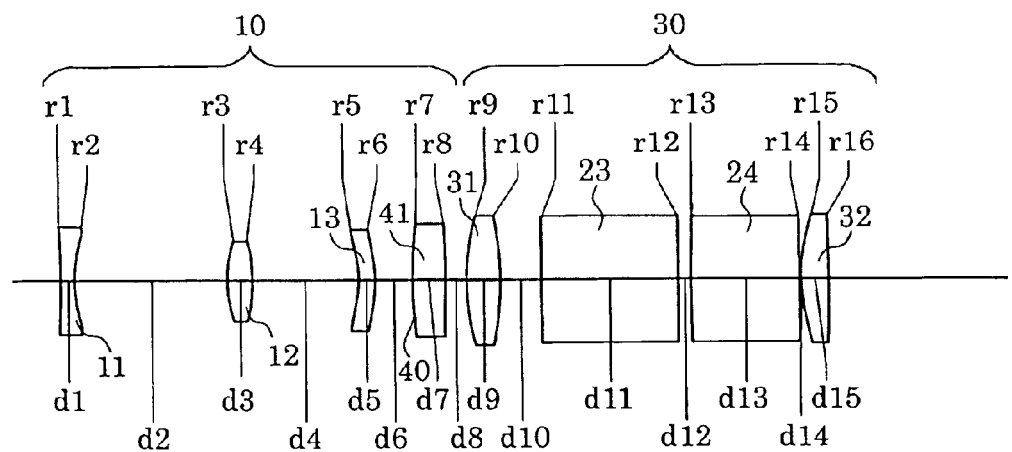
FIG. 16 shows the optical arrangement according to a fifth embodiment, in which the reflection surfaces of a real-image finder optical system are shown as developed views.

FIG. 16 shows the optical arrangement according to the fifth embodiment, in which the reflection surfaces of a real-image finder optical system are shown as developed views. The optical arrangement of the fifth embodiment is the same as the first embodiment except that (i) the eyepiece-side surface (surface No. 8) of the planeconvex lens element 41 (surface Nos. 7 and 8) is the flat surface, (ii) the position where the object image by the objective optical system is formed is on the surface No. 8, (iii) similar to the fourth embodiment, on the eyepiece side with respect to the object image, two separate prisms 23 and 24 are provided, i.e., in the prism 23, two reflection surfaces are used, and in the prism 24, one reflection surface is used, and (iv) the eyepiece lens element 32 (surface Nos. 15 and 16) is a planoconvex lens element. FIGS. 17A through 17D show aberrations, at the short focal length extremity, occurred in the optical arrangement shown in FIG. 16. FIGS. 18A through 18D show aberrations, at the long focal length extremity, occurred in the optical arrangement shown in FIG. 16. Table 5 shows the numerical data of this embodiment.

TABLE 5

|  | S.F.L.E. |  | L.F.L.E. |
| --- | --- | --- | --- |
| Finder Magnification (fo/fe) | 0.39 | — | 1.06 |
| Diopter [dptr] = −1.0 | | | |

| Surface No. | r | d | Nd | ν |
| --- | --- | --- | --- | --- |
| 1* | −33.037 | 1.30 | 1.58547 | 29.9 |
| 2 | 10.358 | 13.80–2.800 | — | — |
| 3* | 8.017 | 2.10 | 1.49176 | 57.4 |
| 4 | −13.144 | 9.66–20.660 | — | — |
| 5* | −15.001 | 1.50 | 1.49176 | 57.4 |
| 6 | −13.927 | 3.41 | — | — |
| 7 | 26.948 | 3.00 | 1.49176 | 57.4 |
| 8 | ∞ | 2.00 | — | — |
| 9 | 17.515 | 3.10 | 1.49176 | 57.4 |
| 10* | −16.422 | 3.82 | — | — |
| 11 | ∞ | 12.50 | 1.49176 | 57.4 |
| 12 | ∞ | 1.10 | — | — |
| 13 | 160.316 | 9.90 | 1.49176 | 57.4 |
| 14 | ∞ | 0.20 | — | — |
| 15* | 13.130 | 2.50 | 1.49176 | 57.4 |
| 16 | ∞ | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
| --- | --- | --- | --- |
| 1 | 0.00 | $0.3590 \times 10^{-3}$ | $-0.6560 \times 10^{-5}$ |
| 3 | 0.00 | $-0.5880 \times 10^{-3}$ | $-0.1930 \times 10^{-5}$ |
| 5 | 0.00 | $-0.1280 \times 10^{-2}$ | $0.1180 \times 10^{-4}$ |
| 10 | 0.00 | $0.4960 \times 10^{-3}$ | $-0.3290 \times 10^{-5}$ |
| 15 | 0.00 | $-0.8000 \times 10^{-4}$ | $-0.3600 \times 10^{-6}$ |

[Embodiment 6]

Figure 19:
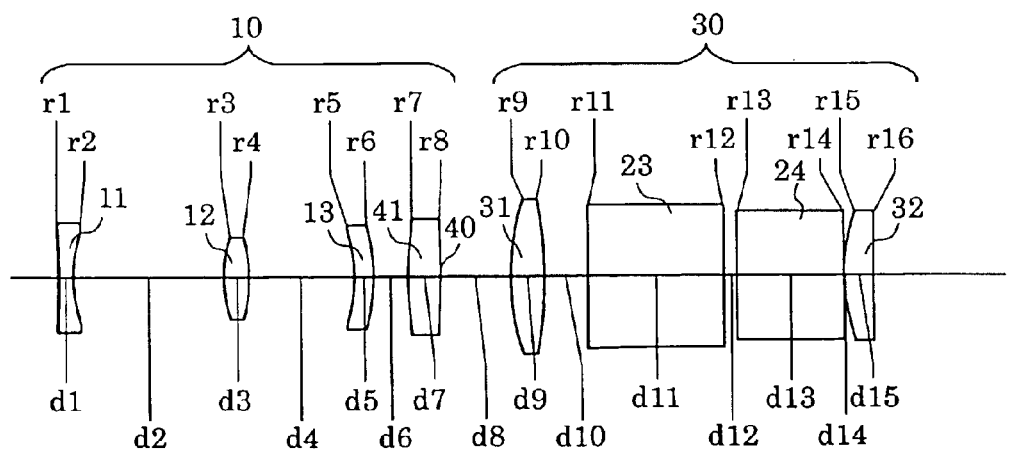
FIG. 19 shows the optical arrangement according to a sixth embodiment, in which the reflection surfaces of a real-image finder optical system are shown as developed views.
Figure 17A:
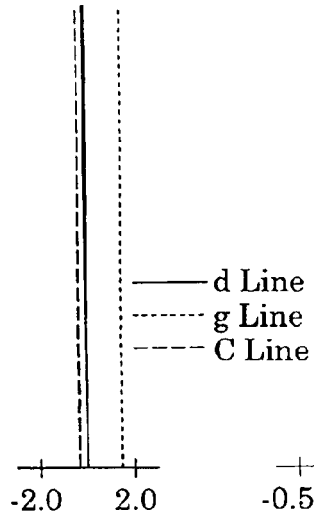
FIGS. 17A, 17B, 17C and 17D show aberrations, at the short focal length extremity, occurred in the optical arrangement shown in FIG. 16.
Figure 17B:
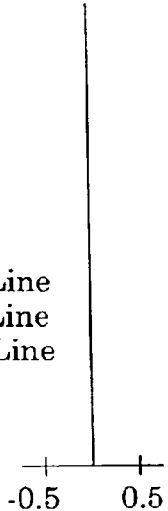
Figure 17C:
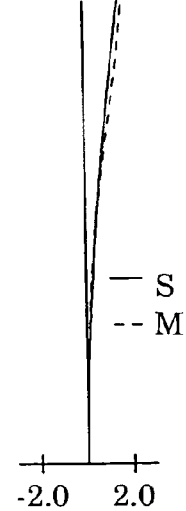
Figure 17D:
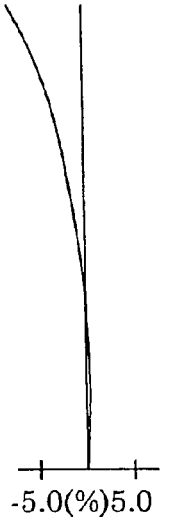
Figure 18A:
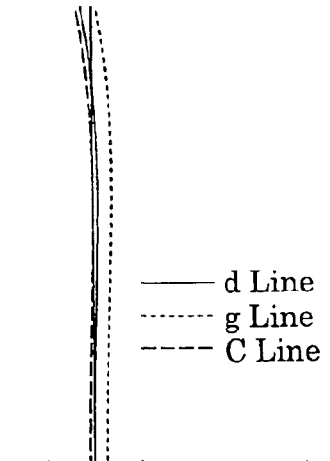
FIGS. 18A, 18B, 18C and 18D show aberrations, at the long focal length extremity, occurred in the optical arrangement shown in FIG. 16.
Figure 18B:
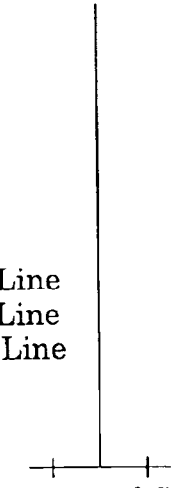
Figure 18C:
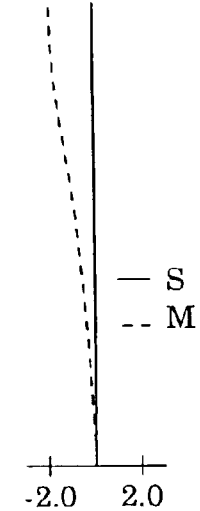
Figure 18D:
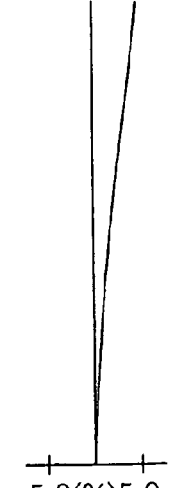
Figure 20A:
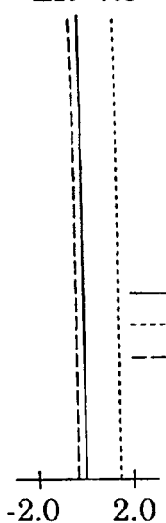
FIGS. 20A, 20B, 20C and 20D show aberrations, at the short focal length extremity, occurred in the optical arrangement shown in FIG. 19.
Figure 20B:
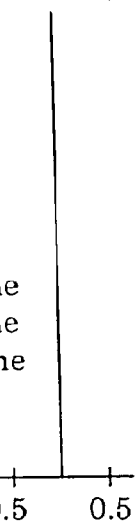
Figure 20C:
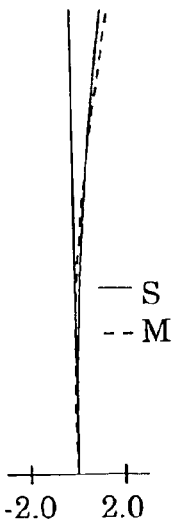
Figure 20D:
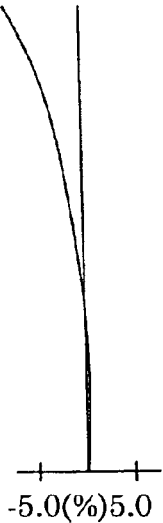
Figure 21A:
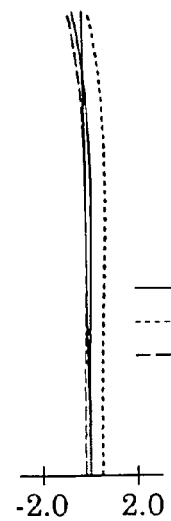
FIGS. 21A, 21B, 21C and 21D show aberrations, at the long focal length extremity, occurred in the optical arrangement shown in FIG. 19.
Figure 21B:
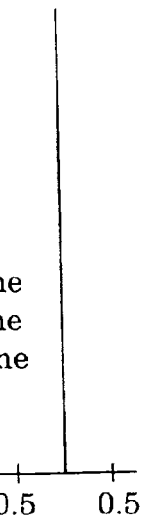
Figure 21C:
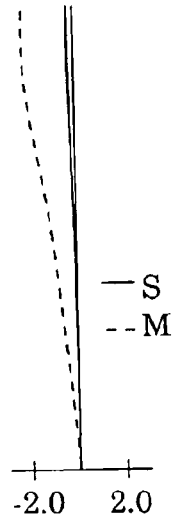
Figure 21D:
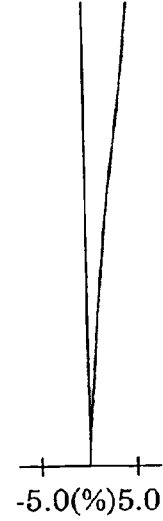

FIG. 19 shows the optical arrangement according to the sixth embodiment, in which the reflection surfaces of a real-image finder optical system are shown as developed views. The basic optical arrangement of the sixth embodiment is substantially the same as the fifth embodiment. FIGS. 20A through 20D show aberrations, at the short focal length extremity, occurred in the optical arrangement shown in FIG. 19. FIGS. 21A through 21D show aberrations, at the long focal length extremity, occurred in the optical arrangement shown in FIG. 19. Table 6 shows the numerical data of this embodiment.

TABLE 6

|  | S.F.L.E. |  | L.F.L.E. |
| --- | --- | --- | --- |
| Finder Magnification (fo/fe) | 0.39 | — | 1.05 |
| Diopter [dptr] = −1.0 | | | |

TABLE 6-continued

| Surface No. | r | d | Nd | ν |
| --- | --- | --- | --- | --- |
| 1* | −40.052 | 1.30 | 1.58547 | 29.9 |
| 2 | 9.741 | 13.80–2.880 | — | — |
| 3* | 7.916 | 2.10 | 1.49176 | 57.4 |
| 4 | −13.329 | 9.71–20.620 | — | — |
| 5* | −15.880 | 1.80 | 1.49176 | 57.4 |
| 6 | −13.707 | 3.10 | — | — |
| 7 | 29.608 | 3.00 | 1.49176 | 57.4 |
| 8 | ∞ | 6.61 | — | — |
| 9 | 16.987 | 3.10 | 1.49176 | 57.4 |
| 10* | −17.834 | 4.08 | — | — |
| 11 | ∞ | 12.50 | 1.49176 | 57.4 |
| 12 | ∞ | 1.10 | — | — |
| 13 | ∞ | 9.90 | 1.49176 | 57.4 |
| 14 | ∞ | 0.20 | — | — |
| 15* | 17.680 | 2.50 | 1.49176 | 57.4 |
| 16 | ∞ | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
| --- | --- | --- | --- |
| 1 | 0.00 | $0.3250 \times 10^{-3}$ | $-0.5950 \times 10^{-5}$ |
| 3 | 0.00 | $-0.5500 \times 10^{-3}$ | $-0.2870 \times 10^{-5}$ |
| 5 | 0.00 | $-0.1370 \times 10^{-2}$ | $0.8520 \times 10^{-5}$ |
| 10 | 0.00 | $0.2460 \times 10^{-3}$ | $-0.6730 \times 10^{-6}$ |
| 15 | 0.00 | $-0.2710 \times 10^{-4}$ | $-0.3980 \times 10^{-6}$ |

[Embodiment 7]

Figure 24:
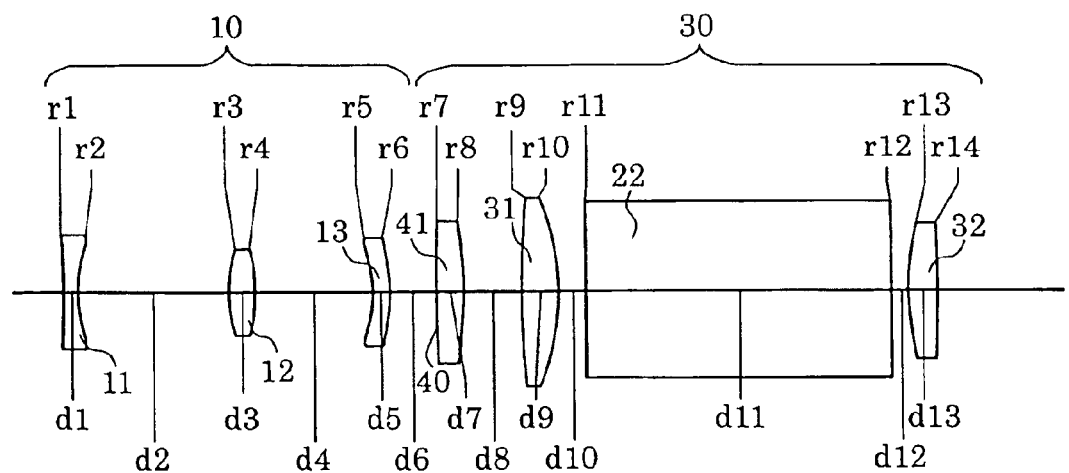
FIG. 24 shows the optical arrangement according to a seventh embodiment, in which the reflection surfaces of a real-image finder optical system are shown as developed views.

FIG. 24 shows the optical arrangement according to the seventh embodiment, in which the reflection surfaces of a real-image finder optical system are shown as developed views. In the seventh to twelfth embodiments, in addition the positive lens element 31 which has a transverse magnification of more than 1.0 and is provided in the eyepiece optical system, a negative third lens 13 element with a transverse magnification of more than 1.0 is provided in the objective optical system. In the real-image finder optical system shown in FIG. 24, an object image, formed through an optical system on the object side with respect to the negative lens element 13, is magnified by the negative lens element 13, and the magnified object image is further magnified by the positive lens element 31 provided on the eyepiece side with respect to the object image; and the further magnified object image is viewed through the eyepiece optical system 30.

In the seventh embodiment, the negative third lens element 13 (surface Nos. 5 and 6) is a negative meniscus lens element, the element 41 (surface Nos. 7 and 8) is a planoconvex lens element, and the eyepiece lens element 32 is a planoconvex lens element. FIGS. 25A through 25D show aberrations, at the short focal length extremity, occurred in the optical arrangement shown in FIG. 24. FIGS. 26A through 26D show aberrations, at the long focal length extremity, occurred in the optical arrangement shown in FIG. 24. Table 7 shows the numerical data of this embodiment.

TABLE 7

|  | S.F.L.E. |  | L.F.L.E. |
| --- | --- | --- | --- |
| Finder Magnification (fo/fe) | 0.39 | — | 1.06 |
| Diopter [dptr] = −1.02 | | | |

TABLE 7-continued

| Surface No. | r | d | Nd | ν |
|---|---|---|---|---|
| 1* | −31.167 | 1.30 | 1.58547 | 29.9 |
| 2 | 9.886 | 13.70–3.02 | — | — |
| 3* | 8.000 | 2.20 | 1.49176 | 57.4 |
| 4 | −12.309 | 10.81–21.49 | — | — |
| 5* | −10.000 | 1.50 | 1.49176 | 57.4 |
| 6 | −14.283 | 4.32 | — | — |
| 7 | ∞ | 2.50 | 1.49176 | 57.4 |
| 8 | −26.913 | 5.30 | — | — |
| 9 | 58.293 | 3.50 | 1.49176 | 57.4 |
| 10* | −12.635 | 2.41 | — | — |
| 11 | ∞ | 28.00 | 1.49176 | 57.4 |
| 12 | ∞ | 1.50 | — | — |
| 13* | 19.750 | 2.50 | 1.49176 | 57.4 |
| 14 | ∞ | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | $0.3170 \times 10^{-3}$ | $-0.5620 \times 10^{-5}$ |
| 3 | 0.00 | $-0.5730 \times 10^{-3}$ | $-0.2560 \times 10^{-5}$ |
| 5 | 0.00 | $-0.1182 \times 10^{-2}$ | $-0.6540 \times 10^{-5}$ |
| 10 | 0.00 | $0.9820 \times 10^{-4}$ | $0.6000 \times 10^{-8}$ |
| 13 | 0.00 | $-0.2200 \times 10^{-4}$ | $-0.2680 \times 10^{-6}$ |

[Embodiment 8]

Figure 27:
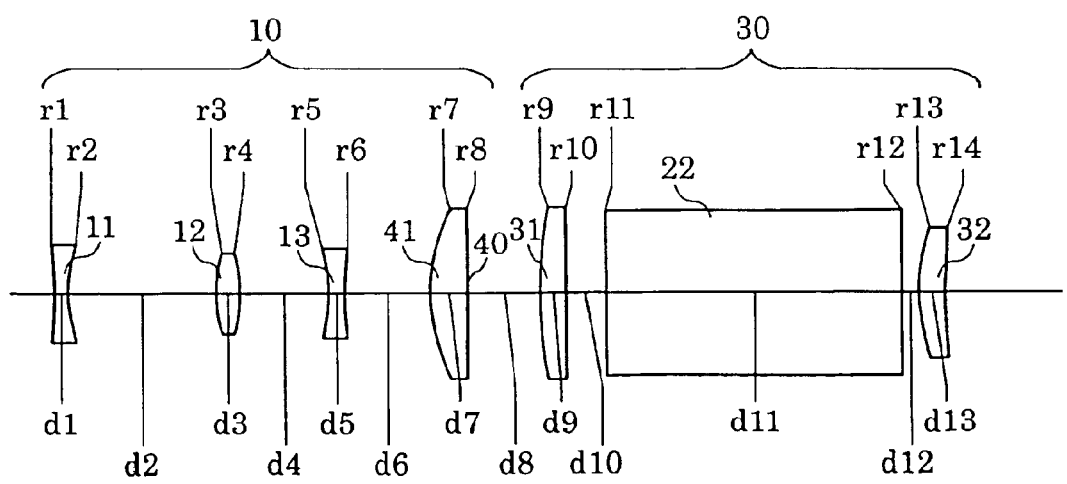
FIG. 27 shows the optical arrangement according to an eighth embodiment, in which the reflection surfaces of a real-image finder optical system are shown as developed views.
Figure 28A:
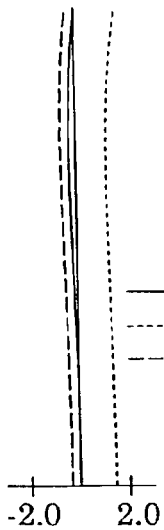
FIGS. 28A, 28B, 28C and 28D show aberrations, at the short focal length extremity, occurred in the optical arrangement shown in FIG. 27.
Figure 28B:
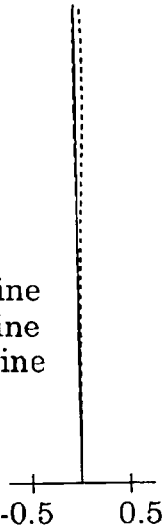
Figure 28C:
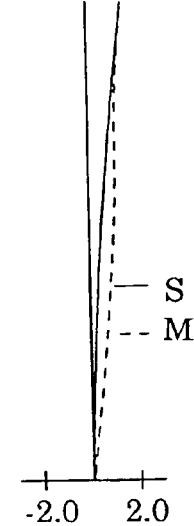
Figure 28D:
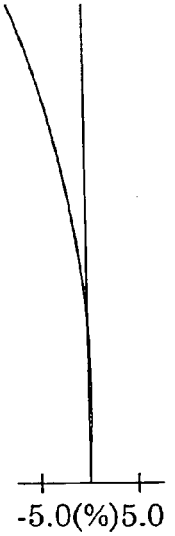
Figure 29A:
FIGS. 29A, 29B, 29C and 29D show aberrations, at the long focal length extremity, occurred in the optical arrangement shown in FIG. 27.
Figure 29B:
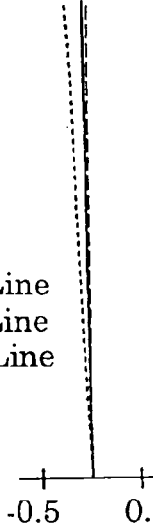
Figure 29C:
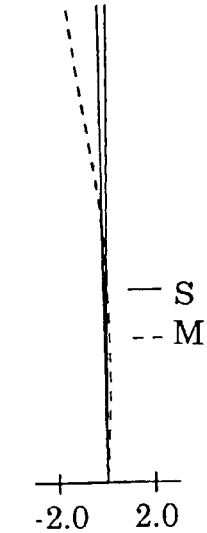
Figure 29D:
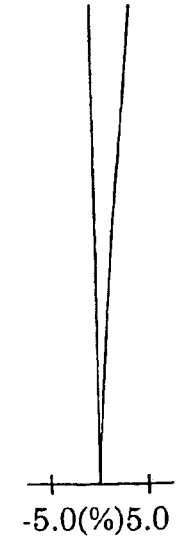

FIG. 27 shows the optical arrangement according to the eighth embodiment, in which the reflection surfaces of a real-image finder optical system are shown as developed views. The optical arrangement of the eighth embodiment is the same as the seventh embodiment except that (i) the negative third lens element 13 (surface Nos. 5 and 6) in the objective optical system is a biconcave lens element, (ii) the eyepiece-side surface (surface No. 8) of the planoconvex lens element 41 is the flat surface, (iii) the position where the object image by the objective optical system is formed is the flat surface (surface No. 8) of the planoconvex lens element, and (iv) the eyepiece lens element 32 (surface Nos. 13 and 14) is a positive meniscus lens element. FIGS. 28A through 28D show aberrations, at the short focal length extremity, occurred in the arrangement shown in FIG. 27. FIGS. 29A through 29D show aberrations, at the long focal length extremity, occurred in the optical arrangement shown in FIG. 27. Table 8 shows the numerical data of this embodiment.

TABLE 8

| | S.F.L.E. | L.F.L.E. |
|---|---|---|
| Finder Magnification (fo/fe) Diopter [dptr] = −0.99 | 0.38 | 1.03 |

| Surface No. | r | d | Nd | ν |
|---|---|---|---|---|
| 1* | −26.543 | 1.30 | 1.58547 | 29.9 |
| 2 | 8.914 | 13.80–3.70 | — | — |
| 3* | 8.000 | 2.10 | 1.49176 | 57.4 |
| 4 | −10.979 | 8.30–18.40 | — | — |
| 5* | −10.155 | 1.50 | 1.49176 | 57.4 |
| 6 | 22.765 | 8.02 | — | — |
| 7 | 11.948 | 3.50 | 1.49176 | 57.4 |
| 8 | ∞ | 6.81 | — | — |
| 9* | 31.991 | 2.50 | 1.49176 | 57.4 |

TABLE 8-continued

| 10 | −167.949 | 3.50 | — | — |
|---|---|---|---|---|
| 11 | ∞ | 28.00 | 1.49176 | 57.4 |
| 12 | ∞ | 1.50 | — | — |
| 13* | 12.432 | 2.50 | 1.49176 | 57.4 |
| 14 | 45.915 | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | $0.4310 \times 10^{-3}$ | $-0.7700 \times 10^{-5}$ |
| 3 | 0.00 | $-0.7020 \times 10^{-3}$ | $0.3380 \times 10^{-5}$ |
| 5 | 0.00 | $-0.1150 \times 10^{-3}$ | $-0.1090 \times 10^{-4}$ |
| 9 | 0.00 | $0.1559 \times 10^{-3}$ | $-0.3750 \times 10^{-5}$ |
| 13 | 0.00 | $-0.8400 \times 10^{-4}$ | $-0.4880 \times 10^{-6}$ |

[Embodiment 9]

Figure 30:
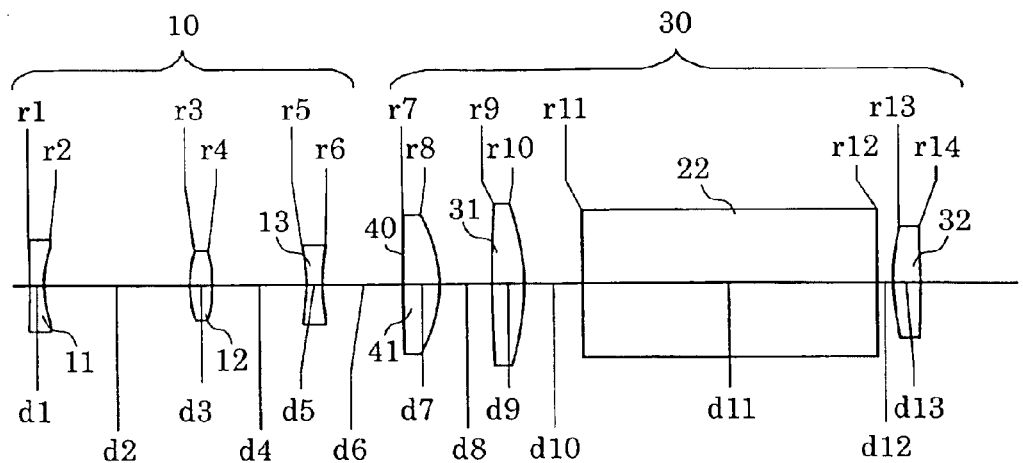
FIG. 30 shows the optical arrangement according to a ninth embodiment, in which the reflection surfaces of a real-image finder optical system are shown as developed views.

FIG. 30 shows the optical arrangement according to the ninth embodiment, in which the reflection surfaces of a real-image finder optical system are shown as developed views. The optical arrangement of the ninth embodiment is the same as the seventh embodiment except that (i) the negative third lens element 13 (surface Nos. 5 and 6) in the objective optical system biconcave lens element, and (ii) the eyepiece lens element 32 (surface Nos. 13 and 14) is a positive meniscus lens element. FIGS. 31A through 31D show aberrations, at the short focal length extremity, occurred in the optical arrangement shown in FIG. 30. FIGS. 32A through 32D show aberrations, at the long focal length extremity, occurred in the optical arrangement shown in FIG. 30. Table 9 shows the numerical data of this embodiment.

TABLE 9

| | S.F.L.E. | | L.F.L.E. |
|---|---|---|---|
| Finder Magnification (fo/fe) Diopter [dptr] = −1.00 | 0.40 | — | 1.07 |

| Surface No. | r | d | Nd | ν |
|---|---|---|---|---|
| 1* | −33.030 | 1.30 | 1.58547 | 29.9 |
| 2 | 8.988 | 13.80–3.39 | — | — |
| 3* | 8.000 | 2.10 | 1.49176 | 57.4 |
| 4 | −11.604 | 8.77–19.18 | — | — |
| 5* | −29.764 | 1.50 | 1.49176 | 57.4 |
| 6 | 15.370 | 7.66 | — | — |
| 7 | ∞ | 3.50 | 1.49176 | 57.4 |
| 8 | −11.482 | 4.93 | — | — |
| 9 | 126.895 | 3.00 | 1.49176 | 57.4 |
| 10* | −20.446 | 5.43 | — | — |
| 11 | ∞ | 28.50 | 1.49176 | 57.4 |
| 12 | ∞ | 1.50 | — | — |
| 13* | 19.234 | 2.50 | 1.49176 | 57.4 |
| 14 | 834.632 | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | 0.2990 × 10⁻³ | −0.5490 × 10⁻⁵ |
| 3 | 0.00 | −0.5600 × 10⁻³ | −0.3010 × 10⁻⁶ |
| 5 | 0.00 | −0.9140 × 10⁻³ | −0.2940 × 10⁻⁴ |
| 10 | 0.00 | 0.2280 × 10⁻⁴ | −0.8230 × 10⁻⁷ |
| 13 | 0.00 | −0.3920 × 10⁻⁴ | −0.1090 × 10⁻⁶ |

[Embodiment 10]

Figure 33:
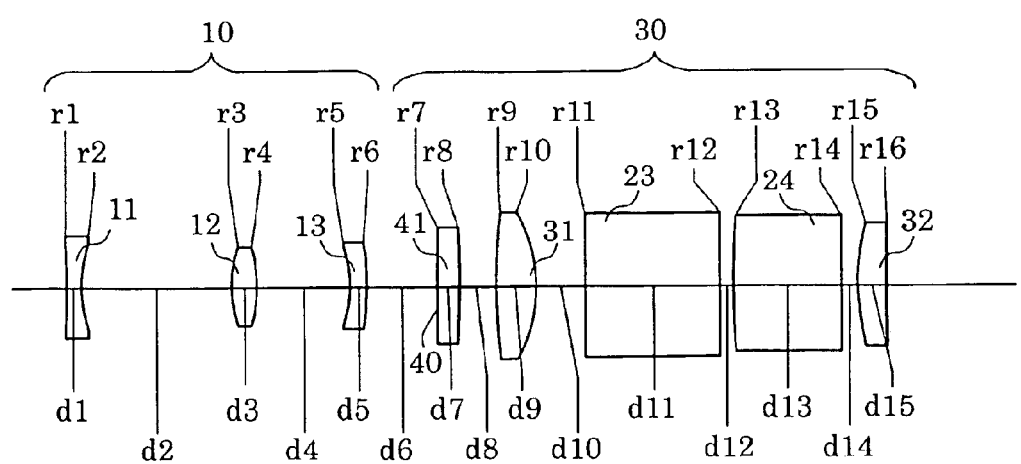
FIG. 33 shows the optical arrangement according to a tenth embodiment, in which the reflection surfaces of a real-image finder optical system are shown as developed views.

FIG. 33 shows the optical arrangement according to the tenth embodiment, in which the reflection surfaces of a real-image finder optical system are shown as developed views. The optical arrangement of the tenth embodiment is the same as the seventh embodiment except that (i) the planoconvex lens element 41 is replaced with a plane-parallel plate 41', (ii) the position where the object image by the objective optical system is formed is the object-side plane of the plane-parallel plate 41', i.e., surface No. 7, and (iii) on the eyepiece side with respect to the object image, two separate prisms 23 and 24 are provided, i.e., in the prism 23, two reflection surfaces are used, and in the prism 24, one reflection surface is used. FIGS. 34A through 34D show aberrations, at the short focal length extremity, occurred in the optical arrangement shown in FIG. 33. FIGS. 35A through 35D show aberrations, at the long focal length extremity, occurred in the optical arrangement shown in FIG. 33. Table 10 shows the numerical data of this embodiment.

TABLE 10

| | S.F.L.E. | | L.F.L.E. |
|---|---|---|---|
| Finder Magnification (fo/fe) | 0.39 | — | 1.05 |
| Diopter [dptr] = −1.01 | | | |

| Surface No. | r | d | Nd | ν |
|---|---|---|---|---|
| 1* | −32.303 | 1.30 | 1.58547 | 29.9 |
| 2 | 8.498 | 13.70–3.55 | — | — |
| 3* | 8.000 | 2.20 | 1.49176 | 57.4 |
| 4 | −10.894 | 8.47–18.62 | — | — |
| 5* | −10.044 | 1.50 | 1.49176 | 57.4 |
| 6 | −14.998 | 6.43 | — | — |
| 7 | ∞ | 2.00 | 1.49176 | 57.4 |
| 8 | ∞ | 3.36 | — | — |
| 9 | 57.678 | 3.60 | 1.49176 | 57.4 |
| 10* | −10.000 | 4.51 | — | — |
| 11 | ∞ | 12.50 | 1.49176 | 57.4 |
| 12 | ∞ | 1.10 | — | — |
| 13* | 150.000 | 9.90 | 1.49176 | 57.4 |
| 14 | ∞ | 1.50 | — | — |
| 15* | 18.302 | 2.50 | 1.49176 | 57.4 |
| 16 | ∞ | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | 0.2880 × 10⁻³ | −0.5270 × 10⁻⁵ |
| 3 | 0.00 | −0.5710 × 10⁻³ | −0.3360 × 10⁻⁵ |
| 5 | 0.00 | −0.8660 × 10⁻³ | −0.1750 × 10⁻⁴ |
| 10 | 0.00 | 0.8230 × 10⁻⁴ | 0.1130 × 10⁻⁵ |
| 13 | 0.00 | 0.6760 × 10⁻⁴ | — |
| 15 | 0.00 | −0.7980 × 10⁻⁴ | −0.3770 × 10⁻⁶ |

[Embodiment 11]

Figure 36:
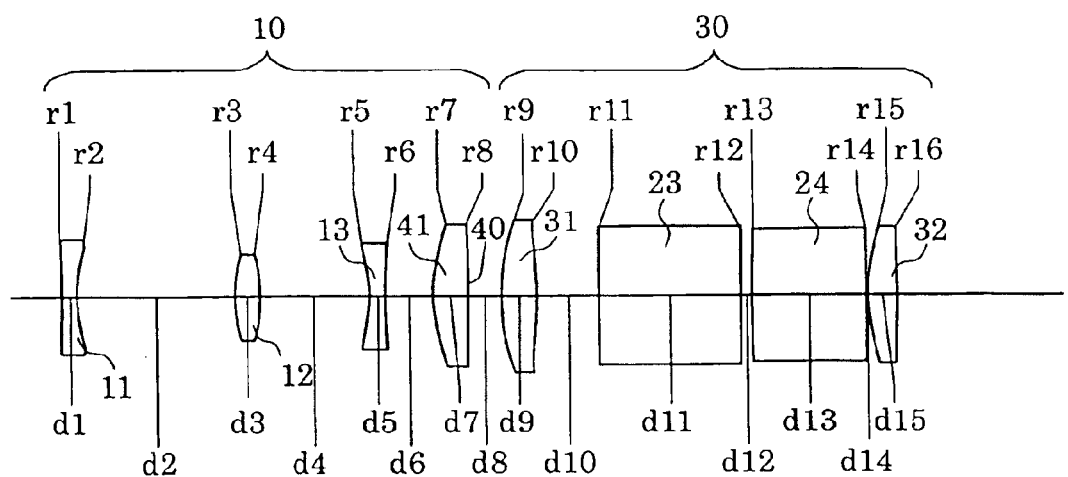
FIG. 36 shows the optical arrangement according to an eleventh embodiment, in which the reflection surfaces of a real-image finder optical system are shown as developed views.

FIG. 36 shows the optical arrangement according to the eleventh embodiment, in which the reflection surfaces of a real-image finder optical system are shown as developed views. The optical arrangement of the eleventh embodiment is the same as the seventh embodiment except that (i) the negative third lens element 13 (surface Nos. 5 and 6) is a biconcave lens element, (ii) the eyepiece-side surface (surface No. 8) of the planoconvex lens element 41 is the flat surface, (iii) the position where the object image by the objective optical system is formed is the flat surface of the planocovex lens element 41, i.e., surface No. 8, and (iv) similar to the tenth embodiment, on the eyepiece side with respect to the object image, two separate prisms 23 and 24 are provided, i.e., in the prism 23, two reflection surfaces are used, and in the prism 24, one reflection surface is used. FIGS. 37A through 37D show aberrations, at the short focal length extremity, occurred in the optical arrangement shown in FIG. 36. FIGS. 38A through 38D show aberrations, at the long focal length extremity, occurred in the optical arrangement shown in FIG. 36. Table 11 shows the numerical data of this embodiment.

TABLE 11

| | S.F.L.E. | | L.F.L.E. |
|---|---|---|---|
| Finder Magnification (fo/fe) | 0.39 | — | 1.06 |
| Diopter [dptr] = −0.99 | | | |

| Surface No. | r | d | Nd | ν |
|---|---|---|---|---|
| 1* | −29.282 | 1.30 | 1.58547 | 29.9 |
| 2 | 9.915 | 13.80–3.14 | — | — |
| 3* | 8.000 | 2.10 | 1.49176 | 57.4 |
| 4 | −12.239 | 9.67–20.33 | — | — |
| 5* | −18.576 | 1.50 | 1.49176 | 57.4 |
| 6 | 39.044 | 4.11 | — | — |
| 7 | 11.096 | 3.00 | 1.49176 | 57.4 |
| 8 | ∞ | 3.08 | — | — |
| 9 | 14.779 | 3.00 | 1.49176 | 57.4 |
| 10* | −27.249 | 5.54 | — | — |
| 11 | ∞ | 12.50 | 1.49176 | 57.4 |
| 12 | ∞ | 1.10 | — | — |
| 13 | ∞ | 9.90 | 1.49176 | 57.4 |
| 14 | ∞ | 0.20 | — | — |
| 15* | 14.114 | 2.50 | 1.49176 | 57.4 |
| 16 | ∞ | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | 0.3450 × 10⁻³ | −0.5930 × 10⁻⁵ |
| 3 | 0.00 | −0.5810 × 10⁻³ | −0.3080 × 10⁻⁵ |
| 5 | 0.00 | −0.1140 × 10⁻² | −0.3000 × 10⁻⁵ |
| 10 | 0.00 | 0.4630 × 10⁻³ | 0.1740 × 10⁻⁶ |
| 15 | 0.00 | −0.6650 × 10⁻⁴ | −0.3410 × 10⁻⁶ |

[Embodiment 12]

Figure 39:
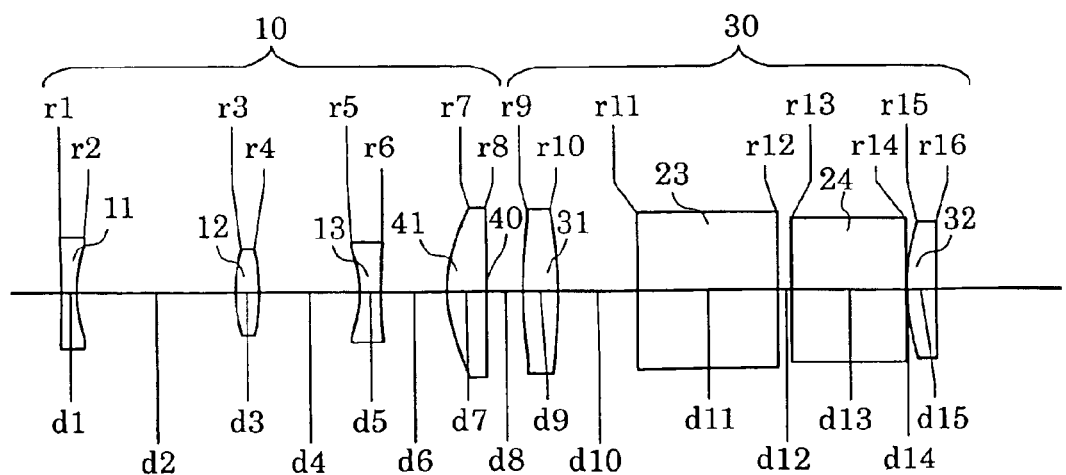
FIG. 39 shows the optical arrangement according to a twelfth embodiment, in which the reflection surfaces of a real-image finder optical system are shown as developed views.

FIG. 39 shows the optical arrangement according to the twelfth embodiment, in which the reflection surfaces of a real-image finder optical system are shown as developed views. The optical arrangement of the twelfth embodiment is the same as the eleventh embodiment. FIGS. 40A through 40D show aberrations, at the short focal length extremity, occurred in the optical arrangement shown in FIG. 39. FIGS. 41A through 41D show aberrations, at the long focal length extremity, occurred in the optical arrangement shown in FIG. 39. Table 12 shows the numerical data of this embodiment.

TABLE 12

|  | S.F.L.E. |  | L.F.L.E. |
|---|---|---|---|
| Finder Magnification (fo/fe) | 0.38 | — | 1.03 |
| Diopter [dptr] = −1.00 | | | |

| Surface No. | r | d | Nd | ν |
|---|---|---|---|---|
| 1* | −31.748 | 1.30 | 1.58547 | 29.9 |
| 2 | 8.800 | 13.80–3.54 | — | — |
| 3* | 8.000 | 2.10 | 1.49176 | 57.4 |
| 4 | −11.319 | 8.93–19.19 | — | — |
| 5* | −9.763 | 2.00 | 1.49176 | 57.4 |
| 6 | 36.000 | 5.69 | — | — |
| 7 | 10.214 | 3.50 | 1.49176 | 57.4 |
| 8 | ∞ | 3.23 | — | — |
| 9* | 36.897 | 3.00 | 1.49176 | 57.4 |
| 10 | −37.902 | 7.06 | — | — |
| 11 | ∞ | 12.50 | 1.49176 | 57.4 |
| 12 | ∞ | 1.10 | — | — |
| 13 | ∞ | 9.90 | 1.49176 | 57.4 |
| 14 | ∞ | 0.20 | — | — |
| 15* | 14.782 | 2.50 | 1.49176 | 57.4 |
| 16 | ∞ | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | $0.3770 \times 10^{-3}$ | $-0.6080 \times 10^{-5}$ |
| 3 | 0.00 | $-0.6720 \times 10^{-3}$ | $0.4100 \times 10^{-5}$ |
| 5 | 0.00 | $-0.5860 \times 10^{-3}$ | $0.2550 \times 10^{-5}$ |
| 9 | 0.00 | $0.9910 \times 10^{-4}$ | $-0.8390 \times 10^{-5}$ |
| 15 | 0.00 | $-0.8200 \times 10^{-4}$ | $0.1800 \times 10^{-7}$ |

[Embodiment 13]

Figure 42:
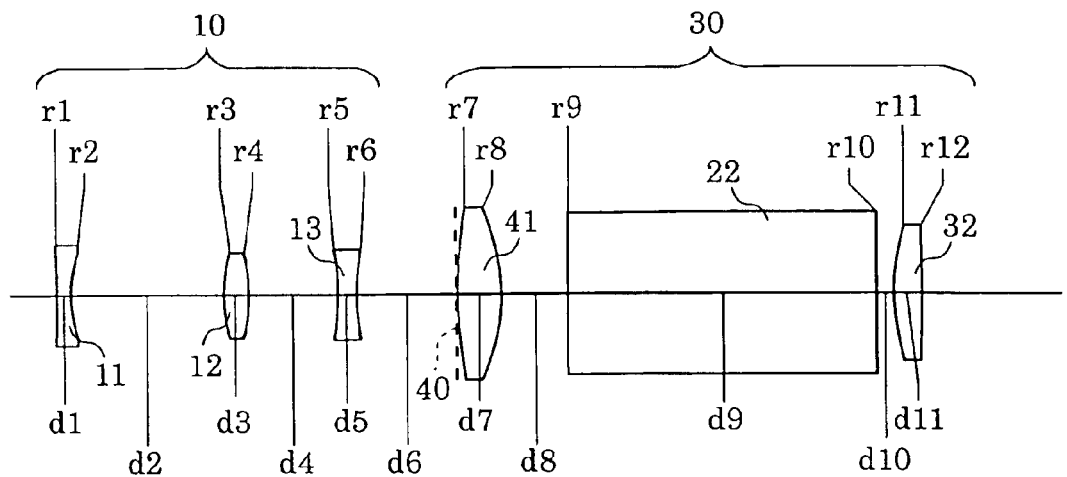
FIG. 42 shows the optical arrangement according to a thirteenth embodiment, in which the reflection surfaces of a real-image finder optical system are shown as developed views.

FIG. 42 shows the optical arrangement according to the thirteenth embodiment, in which the reflection surfaces of a real-image finder optical system are shown as developed views. In the thirteenth to eighteenth embodiments, the biconvex lens element 31 is eliminated. In the thirteenth embodiment, the third lens element 13 (surface Nos. 5 and 6) is a biconcave lens element, the element 41 (surface Nos. 7 and 8) is a biconvex lens element, and the eyepiece lens element 32 is a positive meniscus lens element. FIGS. 43A through 43D show aberrations, at the short focal length extremity, occurred in the optical arrangement shown in FIG. 42. FIGS. 44A through 44D show aberrations, at the long focal length extremity, occurred in the optical arrangement shown in FIG. 42. Table 13 shows the numerical data of this embodiment.

TABLE 13

|  | S.F.L.E. |  | L.F.L.E. |
|---|---|---|---|
| Finder Magnification (fo/fe) | 0.39 | — | 1.05 |
| Diopter [dptr] = −1.01 − −0.93 | | | |

| Surface No. | r | d | Nd | ν |
|---|---|---|---|---|
| 1* | −25.741 | 1.30 | 1.58547 | 29.9 |
| 2* | 9.332 | 13.70–3.51 | — | — |
| 3* | 7.942 | 2.20 | 1.49176 | 57.4 |
| 4 | −11.282 | 7.89–18.08 | — | — |

TABLE 13-continued

| Surface No. | r | d | Nd | ν |
|---|---|---|---|---|
| 5* | −29.775 | 1.80 | 1.49176 | 57.4 |
| 6 | 14.480 | 9.00 | — | — |
| 7 | 28.592 | 4.00 | 1.49176 | 57.4 |
| 8* | −14.406 | 6.00 | — | — |
| 9 | ∞ | 28.00 | 1.49176 | 57.4 |
| 10 | ∞ | 1.50 | — | — |
| 11* | 13.715 | 2.50 | 1.49176 | 57.4 |
| 12 | 167.341 | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | $0.5060 \times 10^{-3}$ | $-0.6940 \times 10^{-5}$ |
| 2 | 0.00 | $0.8300 \times 10^{-4}$ | $0.6880 \times 10^{-5}$ |
| 3 | 0.00 | $-0.6850 \times 10^{-3}$ | $0.3300 \times 10^{-5}$ |
| 5 | 0.00 | $-0.6210 \times 10^{-3}$ | $-0.1000 \times 10^{-4}$ |
| 8 | 0.00 | $-0.2880 \times 10^{-3}$ | $0.3210 \times 10^{-5}$ |
| 11 | 0.00 | $-0.8320 \times 10^{-4}$ | $-0.2190 \times 10^{-6}$ |

[Embodiment 14]

Figure 45:
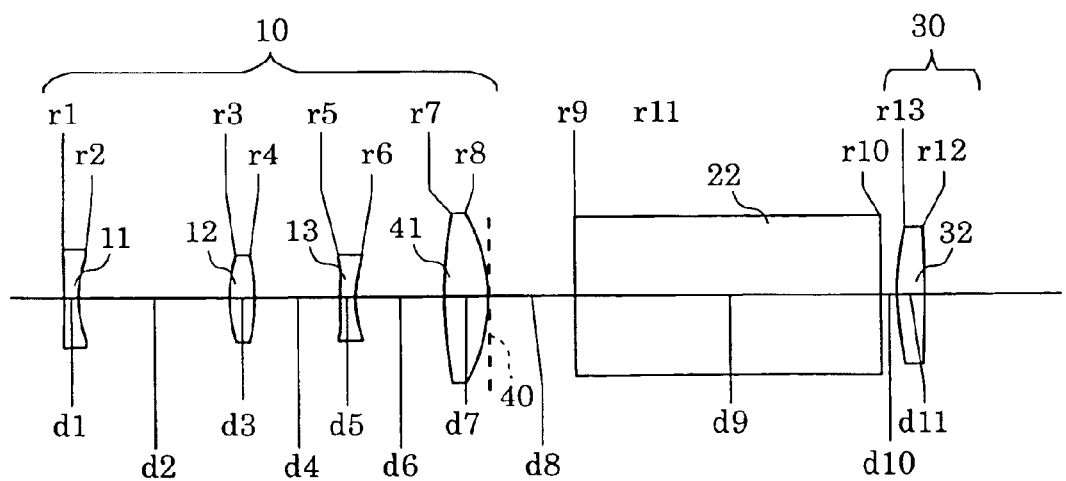
FIG. 45 shows the optical arrangement according to a fourteenth embodiment, in which the reflection surfaces of a real-image finder optical system are shown as developed views.

FIG. 45 shows the optical arrangement according to the fourteenth embodiment, in which the reflection surfaces of a real-image finder optical system are shown as developed views. The optical arrangement of the fourteenth embodiment is the same as the thirteenth embodiment except that (i) the position where the object image by the objective optical system is formed is the eyepiece-side surface of the bicovex condenser lens element 41, i.e. surface No. 8, and (ii) the eyepiece lens element 32 (surface Nos. 11 and 12) is a biconvex lens element. FIGS. 46A through 46D show aberrations, at the short focal length extremity, occurred in the optical arrangement shown in FIG. 45. FIGS. 47A through 47D show aberrations, at the long focal length extremity, occurred in the optical arrangement shown in FIG. 45. Table 14 shows the numerical data of this embodiment.

TABLE 14

|  | S.F.L.E. |  | L.F.L.E. |
|---|---|---|---|
| Finder Magnification (fo/fe) | 0.38 | — | 1.03 |
| Diopter [dptr] = −0.99 − −0.93 | | | |

| Surface No. | r | d | Nd | ν |
|---|---|---|---|---|
| 1* | −22.852 | 1.30 | 1.58547 | 29.9 |
| 2 | 8.863 | 13.70–3.79 | — | — |
| 3* | 8.000 | 2.20 | 1.49176 | 57.4 |
| 4 | −10.382 | 7.60–17.51 | — | — |
| 5* | −53.863 | 1.40 | 1.49176 | 57.4 |
| 6 | 7.792 | 8.07 | — | — |
| 7 | 28.617 | 4.00 | 1.49176 | 57.4 |
| 8* | −10.665 | 7.91 | — | — |
| 9 | ∞ | 28.00 | 1.49176 | 57.4 |
| 10 | ∞ | 1.50 | — | — |
| 11* | 18.829 | 2.50 | 1.49176 | 57.4 |
| 12 | −59.958 | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
| --- | --- | --- | --- |
| 1 | 0.00 | $0.4150 \times 10^{-3}$ | $-0.7260 \times 10^{-5}$ |
| 3 | 0.00 | $-0.7410 \times 10^{-3}$ | $0.4460 \times 10^{-5}$ |
| 5 | 0.00 | $-0.9850 \times 10^{-3}$ | $-0.2940 \times 10^{-5}$ |
| 8 | 0.00 | $-0.2000 \times 10^{-3}$ | $0.3440 \times 10^{-5}$ |
| 11 | 0.00 | $-0.5760 \times 10^{-4}$ | $-0.2010 \times 10^{-6}$ |

[Embodiment 15]

Figure 48:
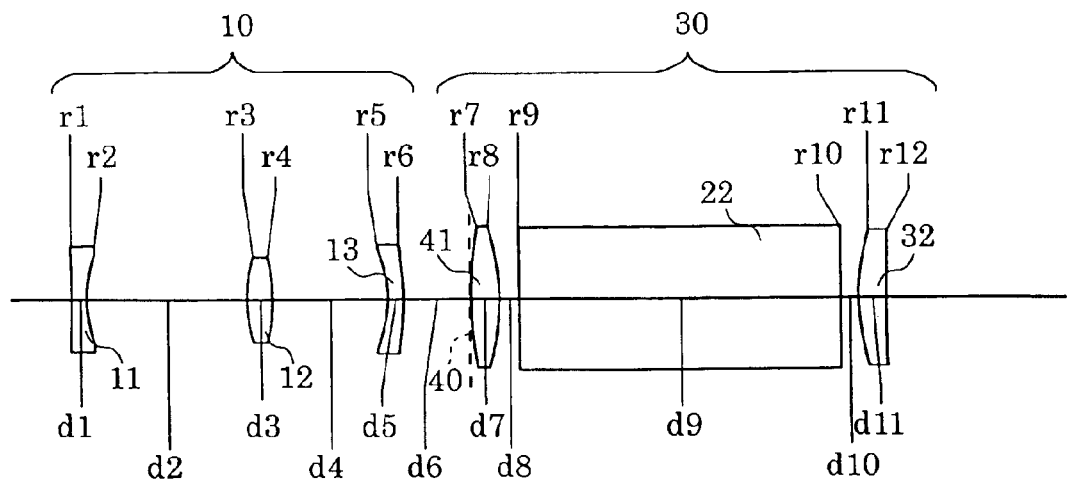
FIG. 48 shows the optical arrangement according to a fifteenth embodiment, in which the reflection surfaces of a real-image finder optical system are shown as developed views.

FIG. 48 shows the optical arrangement according to the fifteenth embodiment in which the reflection surfaces of a real-image finder optical system are shown as developed views. The optical arrangement of the fifteenth embodiment is the same as the thirteenth embodiment except that (i) the negative third lens element 13 (surface Nos. 5 and 6) is a negative meniscus lens element, and (ii) the eyepiece lens element 32 (surface Nos. 11 and 12) is a biconvex lens element. FIGS. 49A through 49D show aberrations, at the short focal length extremity, occurred in the optical arrangement shown in FIG. 48. FIGS. 50A through 50D show aberrations, at the long focal length extremity, occurred in the optical arrangement shown in FIG. 48. Table 15 shows the numerical data of this embodiment.

TABLE 15

| | S.F.L.E. | | L.F.L.E. |
| --- | --- | --- | --- |
| Finder Magnification (fo/fe) Diopter [dptr] = -0.99 - -0.95 | 0.39 | — | 1.05 |

| Surface No. | r | d | Nd | ν |
| --- | --- | --- | --- | --- |
| 1* | -31.077 | 1.30 | 1.58547 | 29.9 |
| 2* | 10.120 | 13.80–3.04 | — | — |
| 3* | 8.073 | 2.10 | 1.49176 | 57.4 |
| 4 | -12.590 | 9.88–20.64 | — | — |
| 5* | -10.000 | 1.40 | 1.49176 | 57.4 |
| 6 | -15.130 | 5.91 | — | — |
| 7 | 29.790 | 2.50 | 1.49176 | 57.4 |
| 8 | -13.647 | 1.70 | — | — |
| 9 | ∞ | 28.00 | 1.49176 | 57.4 |
| 10 | ∞ | 1.50 | — | — |
| 11* | 16.674 | 2.50 | 1.49176 | 57.4 |
| 12 | -43.397 | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
| --- | --- | --- | --- |
| 1 | 0.00 | $0.2790 \times 10^{-3}$ | $-0.2640 \times 10^{-7}$ |
| 2 | 0.00 | $-0.1790 \times 10^{-3}$ | $0.1740 \times 10^{-4}$ |
| 3 | 0.00 | $-0.7130 \times 10^{-3}$ | $0.8610 \times 10^{-5}$ |
| 5 | 0.00 | $-0.8530 \times 10^{-3}$ | $0.4890 \times 10^{-5}$ |
| 11 | 0.00 | $-0.6720 \times 10^{-4}$ | $-0.3730 \times 10^{-6}$ |

[Embodiment 16]

Figure 51:
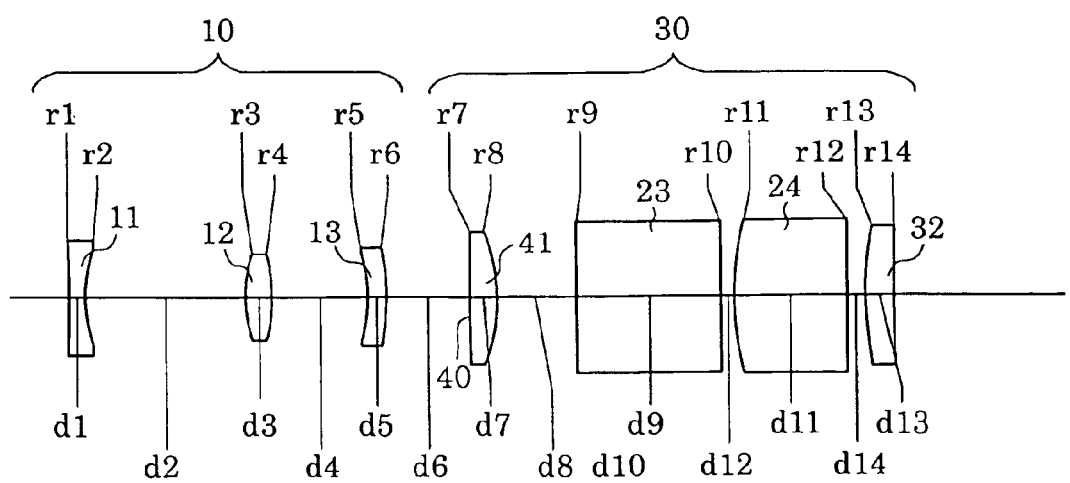
FIG. 51 shows the optical arrangement according to a sixteenth embodiment, in which the reflection surfaces of a real-image finder optical system are shown as developed views.

FIG. 51 shows the optical arrangement according to the sixteenth embodiment, in which the reflection surfaces of a real-image finder optical system are shown as developed views. The optical arrangement of the sixteenth embodiment is the same as the thirteenth embodiment except that (i) the negative third lens element 13 (surface Nos. 5 and 6) is a negative meniscus lens element, (ii) the condenser lens element 41 (surface Nos. 7 and 8) is a planoconvex lens element, (iii) the position where the object image by the objective optical system is formed is the object-side flat surface of the planoconvex condenser lens element 41, i.e., surface No. 7, (iv) on the eyepiece side with respect to the object image, two separate prisms 23 and 24 are provided, i.e., in the prism 23, two reflection surfaces are used, and in the prism 24, one reflection surface is used, and (v) the eyepiece lens element 32 (surface Nos. 13 and 14) is a planoconvex lens element. FIGS. 52A through 52D show aberrations, at the short focal length extremity, occurred in the optical arrangement shown in FIG. 51. FIGS. 53A through 53D show aberrations, at the long focal length extremity, occurred in the optical arrangement shown in FIG. 51. Table 16 shows the numerical data of this embodiment.

TABLE 16

| | S.F.L.E. | | L.F.L.E. |
| --- | --- | --- | --- |
| Finder Magnification (fo/fe) Diopter [dptr] = -0.99—0.93 | 0.39 | — | 1.03 |

| Surface No. | r | d | Nd | ν |
| --- | --- | --- | --- | --- |
| 1* | -21.372 | 1.30 | 1.58547 | 29.9 |
| 2* | 10.683 | 13.70–3.33 | — | — |
| 3* | 8.309 | 2.20 | 1.49176 | 57.4 |
| 4 | -11.146 | 8.29–18.66 | — | — |
| 5* | -10.000 | 1.50 | 1.49176 | 57.4 |
| 6 | -14.740 | 7.34 | — | — |
| 7 | ∞ | 2.20 | 1.49176 | 57.4 |
| 8* | -36.903 | 7.00 | — | — |
| 9 | ∞ | 12.50 | 1.49176 | 57.4 |
| 10 | ∞ | 1.10 | — | — |
| 11* | 17.160 | 9.90 | 1.49176 | 57.4 |
| 12 | ∞ | 1.50 | — | — |
| 13* | 23.321 | 2.50 | 1.49176 | 57.4 |
| 14 | ∞ | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
| --- | --- | --- | --- |
| 1 | 0.00 | $0.3700 \times 10^{-3}$ | $-0.7270 \times 10^{-7}$ |
| 2 | 0.00 | $-0.5200 \times 10^{-4}$ | $0.1830 \times 10^{-4}$ |
| 3 | 0.00 | $-0.6350 \times 10^{-3}$ | $0.1840 \times 10^{-5}$ |
| 5 | 0.00 | $-0.2740 \times 10^{-3}$ | $-0.1790 \times 10^{-4}$ |
| 8 | 0.00 | $-0.1594 \times 10^{-2}$ | $0.1783 \times 10^{-4}$ |
| 11 | 0.00 | $-0.8670 \times 10^{-4}$ | — |
| 13 | 0.00 | $-0.2310 \times 10^{-4}$ | $-0.1900 \times 10^{-6}$ |

[Embodiment 17]

Figure 54:
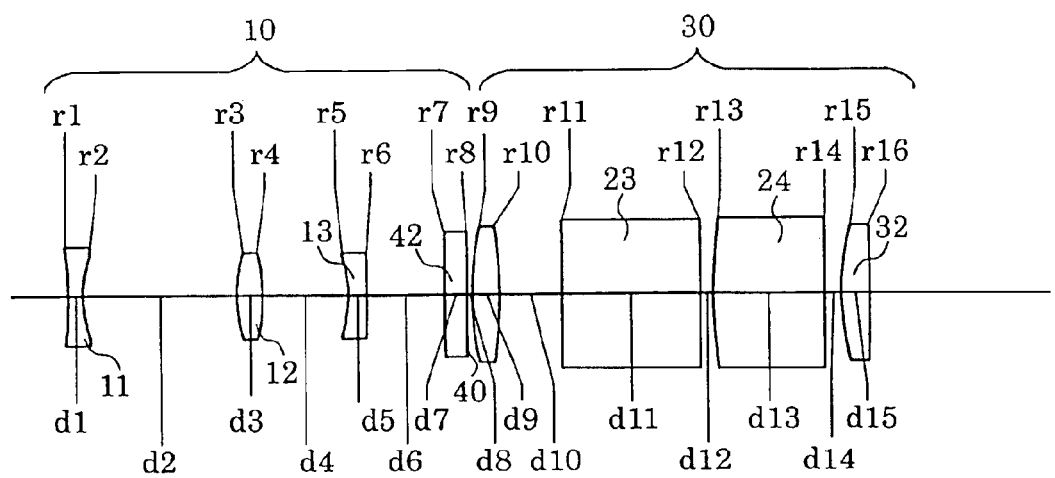
FIG. 54 shows the optical arrangement according to a seventeenth embodiment in which the reflection surfaces of a real-image finder optical system are shown as developed views.

FIG. 54 shows the optical arrangement according to the seventeenth embodiment, in which the reflection surfaces of a real-image finder optical system are shown as developed views. The optical arrangement of the seventeenth embodiment is the same as the thirteenth embodiment except that (i) the negative third lens element 13 (surface Nos. 5 and 6) is a negative meniscus lens element, (ii) on the object-side of the negative third lens element 13, a plane-parallel plate 42 (surface Nos. 7 and 8) is provided, (iii) the position where the object image by the objective optical system is formed is the image-side plane of the plane-parallel plate 42, i.e., surface No. 8, (iv) on the eyepiece side with respect to the object image, two separate prisms 23 and 24 are provided, i.e., in the prism 23, two reflection surfaces are used, and in the prism 24, one reflection surface is used, and (v) the eyepiece lens element 32 is a planoconvex lens element. FIGS. 55A through 55D show aberrations, at the short focal length extremity, occurred in the optical arrangement shown in FIG. 54. FIGS. 56A through 56D show aberrations, at the long focal length extremity, occurred in the optical arrangement shown in FIG. 54. Table 17 shows the numerical data of this embodiment.

TABLE 17

|  | S.F.L.E. |  | L.F.L.E. |  |
|---|---|---|---|---|
| Finder Magnification (fo/fe) | 0.39 | – | 1.05 |  |
| Diopter [dptr] = −0.99—−0.93 |  |  |  |  |
| Surface No. | r | d | Nd | ν |
| 1* | −13.416 | 1.30 | 1.58547 | 29.9 |
| 2* | 10.441 | 13.70–4.08 | — | — |
| 3* | 8.140 | 2.20 | 1.49176 | 57.4 |
| 4 | −9.477 | 7.53–17.15 | — | — |
| 5* | −10.000 | 1.70 | 1.49176 | 57.4 |
| 6 | −120.455 | 6.96 | — | — |
| 7 | ∞ | 2.00 | 1.49176 | 57.4 |
| 8 | ∞ | 0.50 | — | — |
| 9* | 22.053 | 2.40 | 1.49176 | 57.4 |
| 10 | −23.894 | 5.49 | — | — |
| 11 | ∞ | 12.50 | 1.49176 | 57.4 |
| 12 | ∞ | 1.10 | — | — |
| 13 | 29.570 | 9.90 | 1.49176 | 57.4 |
| 14 | ∞ | 1.50 | — | — |
| 15* | 16.366 | 2.50 | 1.49176 | 57.4 |
| 16 | ∞ | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | $0.1324 \times 10^{-2}$ | $-0.2721 \times 10^{-4}$ |
| 2 | 0.00 | $0.9130 \times 10^{-3}$ | $-0.4130 \times 10^{-5}$ |
| 3 | 0.00 | $-0.7450 \times 10^{-3}$ | $0.3740 \times 10^{-5}$ |
| 5 | 0.00 | $-0.6360 \times 10^{-3}$ | $-0.8000 \times 10^{-5}$ |
| 9 | 0.00 | $0.6890 \times 10^{-3}$ | $-0.1390 \times 10^{-4}$ |
| 15 | 0.00 | $-0.9160 \times 10^{-4}$ | $-0.2350 \times 10^{-6}$ |

[Embodiment 18]

Figure 57:
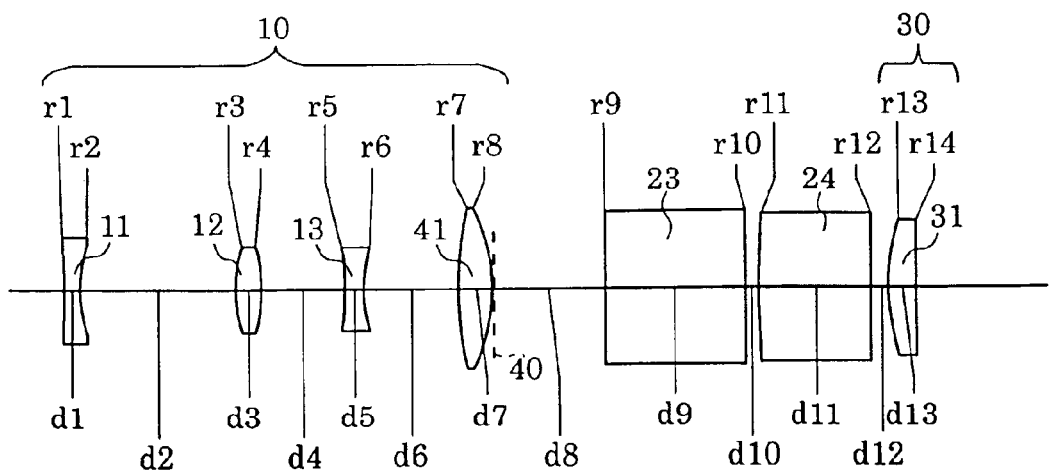
FIG. 57 shows the optical arrangement according to a eighteenth embodiment, in which the reflection surfaces of a real-image finder optical system are shown as developed views.

FIG. 57 shows the optical arrangement according to the eighteenth embodiment, in which the reflection surfaces of a real-image finder optical system are shown as developed views. The optical Arrangement of the eighteenth embodiment is the same as the thirteenth embodiment except that (i) the position where the object image by the objective optical system is formed is the eyepiece-side surface of the biconvex condenser lens element 41, i.e., surface No. 8, (ii) on the eyepiece side with respect to the object image, two separate prisms 23 and 24 are provided, i.e., in the prism 23, two reflection surfaces are used, and in the prism 24, one reflection surface is used, and (iii) the eyepiece lens element 32 is a planoconvex lens element. FIGS. 58A through 58D show aberrations, at the short focal length extremity, occurred in the optical arrangement shown in FIG. 57. FIGS. 59A through 59D show aberrations, at the long focal length extremity, occurred in the optical arrangement shown in FIG. 57. Table 18 shows the numerical data of this embodiment.

TABLE 18

|  | S.F.L.E. |  | L.F.L.E. |  |
|---|---|---|---|---|
| Finder Magnification (fo/fe) | 0.38 | – | 1.03 |  |
| Diopter [dptr] = −1.01—−0.97 |  |  |  |  |
| Surface No. | r | d | Nd | ν |
| 1* | −16.011 | 1.30 | 1.58547 | 29.9 |
| 2* | 9.507 | 13.70–4.04 | — | — |
| 3* | 8.057 | 2.20 | 1.49176 | 57.4 |
| 4 | −9.691 | 7.33–16.99 | — | — |
| 5* | −28.097 | 1.70 | 1.49176 | 57.4 |
| 6 | 8.897 | 8.34 | — | — |
| 7 | 23.172 | 3.00 | 1.49176 | 57.4 |
| 8 | −11.230 | 9.92 | — | — |
| 9 | ∞ | 12.50 | 1.49176 | 57.4 |
| 10 | ∞ | 1.10 | — | — |
| 11 | 80.802 | 9.90 | 1.49176 | 57.4 |
| 12 | ∞ | 1.50 | — | — |
| 13* | 15.289 | 2.50 | 1.49176 | 57.4 |
| 14 | ∞ | — | — | — |

*designates the aspherical surface which is rotationally symmetrical with respect to the optical axis.

Aspherical surface data (the aspherical surface coefficients not indicated are zero (0.00)).

| Surface No. | K | A4 | A6 |
|---|---|---|---|
| 1 | 0.00 | $0.9380 \times 10^{-3}$ | $-0.1760 \times 10^{-4}$ |
| 2 | 0.00 | $0.5970 \times 10^{-3}$ | $-0.8450 \times 10^{-5}$ |
| 3 | 0.00 | $-0.7090 \times 10^{-3}$ | $0.3800 \times 10^{-6}$ |
| 5 | 0.00 | $-0.1064 \times 10^{-2}$ | $-0.1310 \times 10^{-5}$ |
| 13 | 0.00 | $-0.7670 \times 10^{-4}$ | $-0.3130 \times 10^{-6}$ |

TABLE 19

|  | Cond. (1) | Cond. (1') | Cond. (2) | Cond. (3) | $0.12 \times feL$ |
|---|---|---|---|---|---|
| Embod. 1 | 1.718 | 1.718 | 0.563 | 0.0029 | 4.624 |
| Embod. 2 | 1.239 | 1.239 | 0.635 | 0.0016 | 3.219 |
| Embod. 3 | 1.395 | 1.395 | 0.559 | 0.0023 | 3.684 |
| Embod. 4 | 1.433 | 1.433 | 0.733 | 0.0022 | 3.745 |
| Embod. 5 | 1.212 | 1.212 | 0.706 | 0.0024 | 3.204 |
| Embod. 6 | 1.723 | 1.723 | 0.507 | 0.0040 | 4.314 |

As can be understood from Table 19, each condition of each embodiment has been satisfied, and as can be understood from the aberration diagrams, aberrations have been sufficiently corrected.

TABLE 20

|  | Condition (4) | Condition (1) |
|---|---|---|
| Embodiment 7 | 1.106 | 1.720 |
| Embodiment 6 | 1.802 | 1.149 |
| Embodiment 9 | 1.392 | 1.347 |
| Embodiment 10 | 1.143 | 1.626 |
| Embodiment 11 | 1.275 | 1.236 |
| Embodiment 12 | 1.609 | 1.124 |

As can be understood from Table 20, each condition of each embodiment has been satisfied, and as can be understood from the aberration diagrams, aberrations have been sufficiently corrected.

TABLE 21

|  | Condition (4) |
| --- | --- |
| Embodiment 13 | 1.470 |
| Embodiment 14 | 1.799 |
| Embodiment 15 | 1.136 |
| Embodiment 16 | 1.153 |
| Embodiment 17 | 1.428 |
| Embodiment 18 | 1.792 |

As can be understood from Table 21, each condition of each embodiment has been satisfied, and as can be understood from the aberration diagrams, aberrations have been sufficiently corrected.

According to the embodiments, a small-sized real-image finder optical system which has a high finder magnification and a long eye relief can be obtained.

Further, a small-sized real-image finder optical system in which dust and scratches are not noticeable when an object is viewed through the finder optical system can be obtained.

What is claimed is:

1. A real-image finder optical system comprising a positive objective optical system, an erecting optical system, and a positive eyepiece optical system;

wherein an object image, which is formed by said objective optical system, and is upside down and reversed from left to right, is reinverted by said erecting optical system to the proper orientation;

wherein said erecting optical system comprises a plurality of reflection surfaces, at least one of which is provided along an optical path on the object side with respect to a position where said object image is formed, and at least another of which is provided along an optical path on the eyepiece side with respect to said position where said object image is formed;

wherein said eyepiece optical system comprises a positive lens element;

wherein said positive lens element is provided between said position where said object image is formed and said reflection surface provided along said optical path on the eyepiece side with respect to said position where said object image is formed; and wherein said positive lens element satisfies the following condition:

$$1.2 < mp < 2$$

wherein mp designates the transverse magnification of the positive lens element; and wherein said real-image finder optical system satisfies the following condition:

$$0.4 < fp/feL < 0.8$$

wherein fp designates the focal length of said positive lens element; and feL designates the focal length of the optical system, excluding said positive lens element, on the eyepiece side with respect to said positive lens element.

2. The real-image finder optical system according to claim 1, wherein said erecting optical system comprises a reflection surface provided on the object side with respect to said position where said object image is formed, and three reflection surfaces provided on the eyepiece side with respect to said position where said object image is formed.

3. The real-image finder optical system according to claim 2, wherein said three reflection surfaces provided on the eyepiece side with respect to said position where said object image is formed comprises a prism.

4. The real-image finder optical system according to claim 1, wherein said erecting optical system comprises a roof reflection surface with two reflection surfaces, said roof reflection surface is provided on the object side with respect to said position where said object image is formed.

5. The real-image finder optical system according to claim 4, wherein said erecting optical system comprises two reflection surfaces that are provided on the eyepiece side with respect to said position where said object image is formed.

6. The real-image finder optical system according to claim 5, wherein said two reflection surfaces that are provided on the eyepiece side with respect to said position where said object image is formed comprises a pentagonal prism.

7. The real-image finder optical system according to claim 1, wherein said reflection surface provided on the eyepiece side with respect to said position where said object image is formed comprises a prism, and said positive lens element is integrally formed on an incident surface of said prism.

8. The real-image finder optical system according to claim 1, further comprising a transparent member on which finder-field information is formed, and said transparent member is provided in the vicinity of said position where said object image is formed.

9. The real-image finder optical system according to claim 8, wherein a space between said positive lens element and said transparent member is sealed.

10. The real-image finder optical system according to claim 8, wherein said transparent member comprises a condenser lens.

11. A real-image finder optical system comprising a positive objective optical system, an erecting optical system, and a positive eyepiece optical system;

wherein an object image, which is formed by said objective optical system, and is upside down and reversed from left to right, is reinverted by said erecting optical system to the proper orientation:

wherein said erecting optical system comprises a plurality of reflection surfaces, at least one of which is provided along an optical path on the object side with respect to a position where said object image is formed, and at least another of which is provided along an optical path on the eyepiece side with respect to said position where said object image is formed;

wherein said eyepiece optical system comprises a positive lens element;

wherein said positive lens element is provided between said position where said object image is formed and said reflection surface provided along said optical path on the eyepiece side with respect to said position where said object image is formed;

wherein said positive lens element satisfies the following condition:

$$1.2 < mp < 2$$

wherein mp designates the transverse magnification of the positive lens element; and wherein at least one surface of said positive lens element comprises an aspherical surface that satisfies the following condition:

$0.0005 < (\Delta\alpha pii - \Delta\alpha pi)/fe < 0.01$ wherein $\Delta\alpha pi$ designates the amount of asphericity on the object-side surface of said positive lens element at a position of 0.12×feL from the optical axis;

$\Delta\alpha pii$ designates the amount of asphericity on the eyepiece-side of said positive lens element at a position of 0.12×feL from the optical axis;

fe designates the focal length of the optical system on the eyepiece side with respect to said position where said object image is formed; and feL designates the focal length of the optical system, excluding the positive lens element.

12. A real-image finder optical system comprising a positive objective optical system, an erecting optical system, and a positive eyepiece optical system;

wherein an object image, which is formed by said objective optical system, and is upside down and reversed from left to right, is reinverted by said erecting optical system to the proper orientation;

wherein said erecting optical system comprises a plurality of reflection surfaces, at least one of which is provided along an optical path on the object side with respect to a position where said object image is formed, and at least another of which is provided along an optical path on the eyepiece side with respect to said position where said object image is formed;

wherein said eyepiece optical system comprises a positive lens element having a transverse magnification of more than 1.0;

wherein said positive lens element is provided between said position where said object image is formed and said reflection surface provided along said optical path on the eyepiece side with respect to said position where said object image is formed; and wherein said real-image finder optical system satisfies the following condition:

$0.4 < fp/feL < 0.8$ wherein fp designates the focal length of said positive lens element; and feL designates the focal length of the optical system, excluding said positive lens element, on the eyepiece side with respect to said positive lens element.

13. The real-image finder optical system according to claim 12, further comprising a transparent member on which finder-field information is formed, and said transparent member is provided in the vicinity of said position where said object image is formed.

14. The real-image finder optical system according to claim 13, wherein a space between said positive lens element and said transparent member is sealed.

15. The real-image finder optical system according to claim 13, wherein said transparent member comprises a condenser lens.

16. A real-image finder optical system comprising a positive objective optical system, an erecting optical system, and a positive eyepiece optical system;

wherein an object image, which is formed by said objective optical system, and is upside down and reversed from left to right, is reinverted by said erecting optical system to the proper orientation;

wherein said erecting optical system comprises a plurality of reflection surfaces, at least one of which is provided along an optical path on the object side with respect to a position where said object image is formed, and at least another of which is provided along an optical path on the eyepiece side with respect to said position where said object image is formed;

wherein said eyepiece optical system comprises a positive lens element having a transverse magnification of more than 1.0;

wherein said positive lens element is provided between said position where said object image is formed and said reflection surface provided along said optical path on the eyepiece side with respect to said position where said object image is formed; and wherein at least one surface of said positive lens element comprises an aspherical surface that satisfies the following condition:

$0.0005 < (\Delta\alpha pii - \Delta\alpha pi)/fe < 0.01$ wherein $\Delta\alpha pi$ designates the amount of asphericity on the object-side surface of said positive lens element at a position of 0.12×feL from the optical axis;

$\Delta\alpha pii$ designates the amount of asphericity on the eyepiece-side of said positive lens element at a position of 0.12×feL from the optical axis;

fe designates the focal length of the optical system on the eyepiece side with respect to said position where said object image is formed; and feL designates the focal length of the optical system, excluding the positive lens element.

17. The real-image finder optical system according to claim 16, further comprising a transparent member on which finder-field information is formed, and said transparent member is provided in the vicinity of said position where said object image is formed.

18. The real-image finder optical system according to claim 17, wherein a space between said positive lens element and said transparent member is sealed.

19. The real-image finder optical system according to claim 17, wherein said transparent member comprises a condenser lens.

* * * * *